United States Patent
Yasuda et al.

(10) Patent No.: US 7,590,667 B2
(45) Date of Patent: Sep. 15, 2009

(54) FILE REPLICATION METHOD FOR DISTRIBUTED FILE SYSTEMS

(75) Inventors: Yoshiko Yasuda, Tokorozawa (JP); Shinichi Kawamoto, Hachioji (JP); Atsushi Ebata, Yokohama (JP); Jun Okitsu, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 804 days.

(21) Appl. No.: 10/767,778

(22) Filed: Jan. 30, 2004

(65) Prior Publication Data

US 2004/0205152 A1   Oct. 14, 2004

(30) Foreign Application Priority Data

Jan. 30, 2003   (JP) ............... 2003-021301

(51) Int. Cl.
*G06F 12/00* (2006.01)
*G06F 17/30* (2006.01)
(52) U.S. Cl. .............. 707/201; 707/1; 707/8; 707/10; 707/200; 707/204; 711/161
(58) Field of Classification Search ............ 707/1, 707/8, 10, 200, 201, 204; 711/161
See application file for complete search history.

(56) References Cited

U.S. PATENT DOCUMENTS

| | | | |
|---|---|---|---|
| 5,093,779 A * | 3/1992 | Sakurai | 707/1 |
| 6,205,475 B1 * | 3/2001 | Pitts | 709/218 |
| 6,223,206 B1 * | 4/2001 | Dan et al. | 718/105 |
| 6,408,298 B1 | 6/2002 | Van et al. | |
| 6,691,245 B1 * | 2/2004 | DeKoning | 714/6 |

(Continued)

FOREIGN PATENT DOCUMENTS

JP       7-219830      1/1995

OTHER PUBLICATIONS

Sandhu et al., "Cluster-based file replication in large-scale distributed systems", Proceedings of the 1992 ACM SIGMETRICS joint international conference on Measurement and modeling of computer systems, 1992, pp. 91-102. Download: http://portal.acm.org/citation.cfm?id=133057.133092&coll=ACM&dl=ACM&CFID=35125884&CFTOKEN=30101083.*

(Continued)

*Primary Examiner*—Jean M Corrielus
*Assistant Examiner*—Hares Jami
(74) *Attorney, Agent, or Firm*—Stites & Harbison PLLC; Juan Carlos A. Marquez, Esq.

(57) ABSTRACT

A file replication method which allows, between a plurality of virtualized-and-unified file systems, real-time creation of a partial copy of that one of the virtualized-and-unified file systems as a target of replication is provided. The replication-source virtualized-and-unified file system is provided with a unified management directory for managing a structure of files and directories and the attribute information thereof, replication information for setting the file as an object to be copied, a request reception unit for receiving a request from a client in a unified manner, and a replication unit for judging whether or not replication should be performed in accordance with the unified management directory and the replication information and simultaneously transferring, based on the result of the judgment, the file access request to the replication-source virtualized-and-unified file system and to the replication-destination virtualized-and-unified file system.

11 Claims, 13 Drawing Sheets

U.S. PATENT DOCUMENTS

| | | | |
|---|---|---|---|
| 6,883,073 | B2 | 4/2005 | Arakawa et al. |
| 6,961,681 | B1 * | 11/2005 | Choquier et al. ............... 703/2 |
| 2002/0120763 | A1 | 8/2002 | Miloushev et al. |
| 2002/0133681 | A1 * | 9/2002 | McBrearty et al. .......... 711/165 |
| 2004/0111441 | A1 * | 6/2004 | Saito et al. ................. 707/200 |
| 2005/0086384 | A1 | 4/2005 | Ernst |

OTHER PUBLICATIONS

Stockinger et al., "File and Object Replication in Data Grids", Kluwer Academic Publisher, Jul. 2002, vol. 5, Iss 3. pp. 305-315. Downoad: http://www.springerlink.com/content/vgv6eblnkhc5wk5j/fulltext.pdf.*

"VERITAS File Replicator™ 3.0.2", System Administrator's Guide, Jun. 2001, pp. i-xii and 1-117.

* cited by examiner

HOST TABLE 155

| NS120 | NS121 | NS122 | ~201 |
|-------|-------|-------|------|
| /     | /     | /     | ~202 |
| PS1   | PS2   | PS3   | ~203 |

REPLICATION HOST TABLE 156

| VFS104 | ••• | xxxx | ~301 |
|--------|-----|------|------|
| /      |     |      | ~302 |
| VFS1   | ••• | VFSk | ~303 |

FIG. 7

CAPACITY MANAGEMENT TABLE 158

| WHOLE | VFS103 | VFS104 |
|---|---|---|
| 100 | 100 | 100 |
| 150 | 200 | 150 |

701
702
703

GROUP TABLE 1500

| 0 | 1 | 2 | 3 | ~1601 |
|---|---|---|---|---|
| PS1 | PS1 | PS2 | PS2 | ~1602 |

FILE REPLICATION METHOD FOR DISTRIBUTED FILE SYSTEMS

FIELD OF THE INVENTION

The present invention relates to a method for file replication between a plurality of network storage systems and to a network storage system having the function of file replication.

BACKGROUND OF THE INVENTION

Conventionally, data has been stored in a storage (DAS: Direct Attached Storage) connected directly to a client computer. The data in the DAS is accessible only via the client computer connected directly thereto so that, if the client computer accesses the data in the DAS connected to another client computer, it is necessary for the client computer to access the data via the other client computer connected to the DAS.

As an amount of data to be stored in each of the client computers has increased exponentially due to the recent advancement of network technologies, the need to efficiently manage the data has also grown so that a storage system connected to a network, what is called a network storage, has been introduced as a replacement for the DAS. Since the network storage allows data to be shared by a plurality of client computers, an administrator can efficiently manage at data.

Examples of the network storage include a SAN (Storage Area Network) storage connected to a SAN to provide a block access and a NAS (Network Attached Storage) connected by an IP network, the Infiniband, or the like to provide a file access. Of the examples, the NAS has lower cost than the SAN storage and can easily be shared by a plurality of client computers by using a plurality of standard file access protocols such as NFS (Network File System) and CIFS (Common Internet File System) so that the market thereof has been expanding.

Since the network storage thus allows an administrator to simultaneously and effectively manage data shared by a plurality of client computers, it is used prevalently in the society. On the other hand, the shared data stored in the network storage is backed up by the administrator by using a tape drive or the like to be restored from the tape drive as required. However, since the tape drive is low in speed, the back-up process and restoration process using the tape drive require an enormous amount of time, which disadvantageously increases in direct proportion to an amount of the shared data. In particular, the capacity of the network storage has been expanded increasingly with the recent advancement of hard disk technology so that low-speed tape back-up is inefficient.

To solve the problem of the low-speed tape back-up, a method for holding a replica of shared data held in a network storage not in a tape drive but in another network storage connected to the network has been used recently. The method allows the creation of the replica of shared data and the restoration of the shared data at a speed higher than a method using a tape drive.

For example, a method for creating a copy of a file in real-time in a plurality of network storages is described in "VERITAS File Replicator 3.0.3, System Administrator's Guide, 2001 June", published by VERITAS Software Corporation. In response to receipt of an updating file access request from a client, the VERITAS File Replicator simultaneously transfers the request to a first file system as a target of replication and to a plurality of file systems at replication destinations. Replication is performed with respect to an entire file system as a target.

On the other hand, U.S. Pat. Publication No. 2002/0120763 discloses a method in which a unification virtualizing switch having a special function for file replication termed a journaling file system transfers an updating file access request to a group of servers composing a primary virtualized-and-unified file system and to a secondary file server and thereby creates a copy of an entire file system. Upon receipt of a response from the group of servers composing the primary virtualized-and-unified file system, the journaling file switch returns the response to a client without waiting for the updating request to be processed at the secondary file server. This achieves a reduction in overhead for file copying.

In addition, a replication system for copying, in a distributed computer system, only the subtree of a computer system as a target of replication is disclosed in Japanese Patent Laid-Open No. H07(1995)-219830. In the replication system, a file access request from a client is transferred to a computer system having the file. If the file access request is an updating file access request, a computer system records the occurrence of a change in a log termed a replicated storage change record. The updating request in the replicated storage change record is copied at constant intervals or at prescheduled intervals in a computer system to a replication destination.

The foregoing technologies disclosed in "VERITAS File Replicator 3.0.3, System Administrator's Guide, 2001 June" and U.S. Pat. Publication No. 2002/0120763 can create a copy of a file in real-time between the plurality of network storages and between the plurality of virtualized-and-unified file systems. However, replication should be performed with respect to the entire file system.

Since the capacity of the network storage has been expanded increasingly as described above, if the creation of a file is limited to an entire file system, an increased back-up time presents a problem. In addition, the shared data include an essential and important file which should be backed up and a file which need not be backed up. However, since the creation of a copy is limited to an entire file system in each of the foregoing first and second well-known examples even when it is sufficient for the administrator to acquire a back-up of only the important file, not only the elongated back-up time but also the preparation of a network storage with a sufficient capacity at a copy destination presents problems.

Although the file replication method disclosed in Japanese Patent Laid-Open No. H07(1995)-219830 mentioned above has provided a method for creating a copy of the subtree of the file system, it is impossible to create the copy in real time in response to a file access request from a client. As a result, a back-up of the latest data is not held in such a case where trouble occurs, which presents a problem.

To solve the problems, it is necessary to provide a file replication method which can create a partial copy of a file system in real-time between a plurality of network storages.

It is also necessary to provide a file replication method which can create a partial copy of any of virtualized-and-unified file systems in real time between a plurality of virtualized-and-unified file systems.

In Japanese Patent Laid-Open No. H07(1995)-219830 mentioned above, it is also necessary for the administrator to manually maintain consistency when a trouble occurs in any of the plurality of virtualized-and-unified file systems while they are performing selective file replication or in the network to which the virtualized-and-unified file systems are connected and recovery from the trouble is performed. For manual maintenance of consistency, it is necessary for the administrator to examine whether or not each of the backed up files has already been copied.

To solve the problem, it is necessary to provide a method in which, when a trouble occurs in any of the plurality of virtualized-and-unified file systems while they are performing selective file replication or in the network and trouble recovery is performed, the consistency of a file and directory as objects to be copied is automatically maintained between the plurality of virtualized-and-unified file systems such that the replication is resumed.

SUMMARY OF THE INVENTION

It is therefore a first object of the present invention to provide a file replication method which allows real-time creation of a partial copy of a file system as a target of replication between a plurality of network storages.

A second object of the present invention is to provide a file replication method which allows, between a plurality of virtualized-and-unified file systems, a partial copy of any of the virtualized-and-unified file systems as a target of replication to be created in real time.

A third object of the present invention is to provide a method which allows, even when any of a plurality of virtualized-and-unified file systems or a network to which the file systems are connected becomes fault, while a plurality of network storages or the virtualized-and-unified file systems are creating a partial copy, and that file system on the network recovers from the fault, easy maintenance of consistency between original files and directories and copies thereof.

The first object of the present invention is attained by providing a distributed system composed of a plurality of network storages with a management table for managing the attribute information of files and directories in a file system as a target of replication, with replication information indicating whether or not copying should be performed, with a request reception unit for receiving a file access request from a client, with a judgment unit for judging, when the received file access request is an updating file access request, whether or not replication should be performed by using the management table and the replication information, and with a request processing unit for simultaneously transferring the file access request to the file system in the network storage device as the target of replication and to a file system in the network storage as a replication destination in accordance with the result of the judgment.

A second object of the present invention is attained by providing a unification virtualizing system belonging to a virtualized-and-unified file system as a replication source with a unified management directory for managing the files-and-directories tree structure and file identifiers of the virtualized-and-unified file system as the replication source, with replication information indicative of conditions for determining whether or not a file should be copied, with a request reception unit for receiving a file access request from a client, with a mapping unit for determining a network storage holding therein a target file of the file access request, with a judgment unit for judging, when the received file access request is an updating request, whether or not replication should be performed by using attribute information managed by the unified management directory and the replication information, and with a request processing unit for simultaneously transferring, in accordance with a result of the judgment, the file access request not only to the network storage belonging to the virtualized-and-unified file system as the replication source and determined by the mapping unit but also to a unification virtualizing system as a replication destination.

A third object of the present invention is attained by providing the unification virtualizing system belonging to the virtualized-and-unified file system as a target of replication with, in addition to the units for attaining the second object, a consistency unit for maintaining consistency between files and directories as copied objects at the replication source and files and directories in the virtualized-and-unified file system as the replication destination.

Thus, in the distributed system composed of the plurality of network storages, the request reception unit solely receives the file access request from the client, judges whether or not replication should be performed by using the management table, and transfers only the file access request as the file object to be copied to each of the replication-source network storage and the replication-destination network storage, thereby enabling real-time creation of a partial copy of the file system in the replication-source network storage in another network storage.

If the file access request is issued from the client to the virtualized-and-unified file system composed of the plurality of network storages and the unification virtualizing system, the unification virtualizing system receives the file access request, specifies the network storage which keeps the file to be accessed by using the unified management directory, judges whether or not the file to be accessed in response to the file access request is an object to be copied, and simultaneously transfers the file access request to the network storage to be accessed and to the unification virtualizing system as the target of replication-destination only when the file access request is for the file as the copied object, thereby enabling real-time creation of a partial copy of the replication-source virtualized-and-unified file system in another virtualized-and-unified file system.

Since the unification virtualizing system composing the virtualized-and-unified file system as the target of replication further has the unit for maintaining consistency between the files and directories as copied objects and the files and directories stored in the replication-destination virtualized-and-unified file system, even when the occurrence of trouble impairs the consistency of the files and directories as the objects to be copied between the replication-source and replication-destination virtualized-and-unified file systems, the inconsistency can easily be fixed at the time of trouble recovery.

BRIEF DESCRIPTION OF THE DRAWINGS

FIG. 7 is a view showing a structure of a capacity management table 158 in the foregoing embodiment;

DETAILED DESCRIPTION OF THE PREFERRED EMBODIMENT

Figure 1:
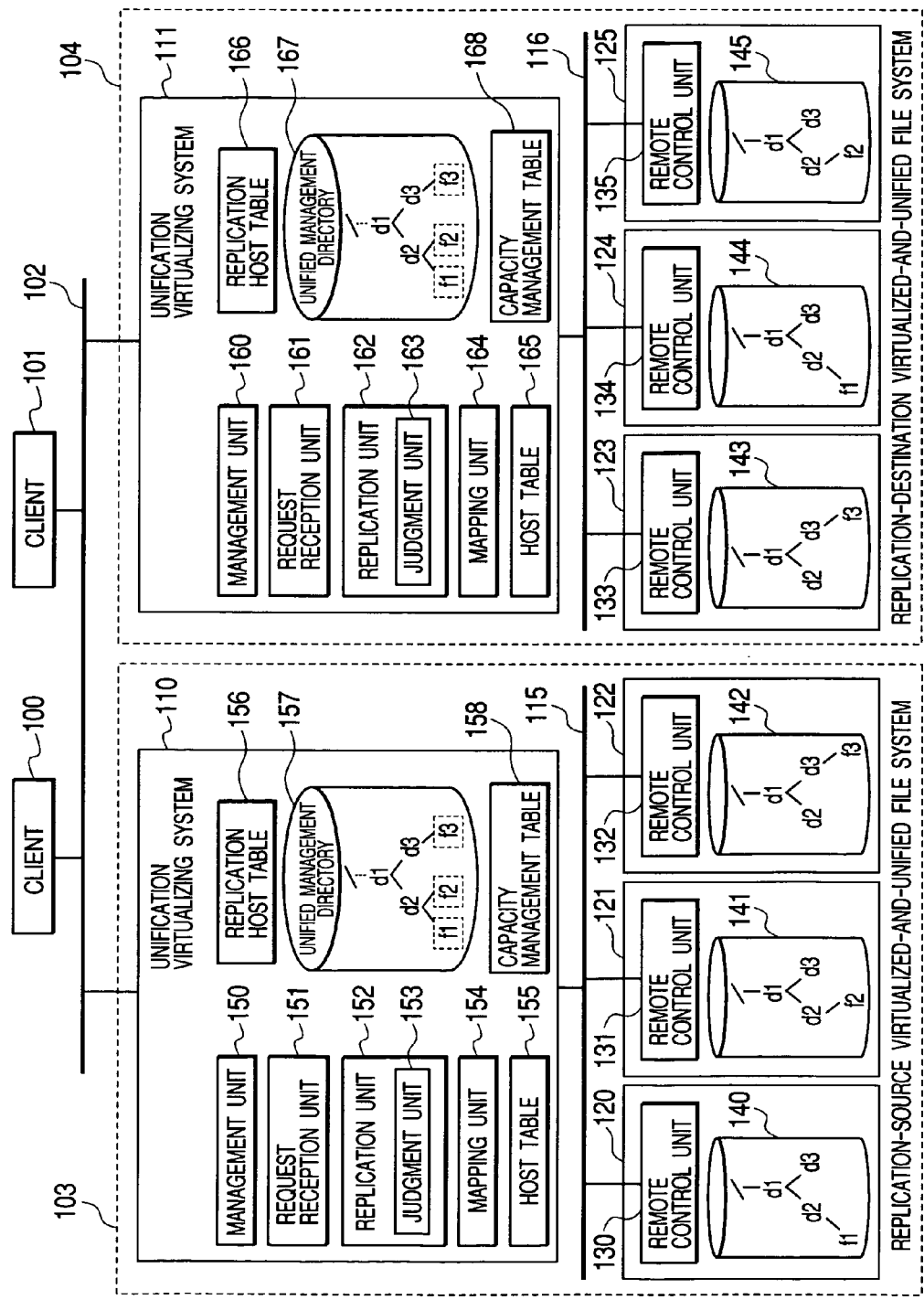
FIG. 1 is a block diagram showing an entire structure of a network storage system as an embodiment of the present invention.

FIG. 1 shows an example of an entire structure of a network storage system as an embodiment of the present invention. The network storage system is constituted by: clients 100 and 101; a network 102; a replication-source virtualized-and-unified file system 103; and a replication-destination virtualized-and-unified file system 104. In the present embodiment, a detailed description will be given to a method for creating, in the replication-destination virtualized-and-unified file system 104, replicas of files and directories in the replication-source virtualized-and-unified file system 103 when the clients 100 and 101 share the file by using the replication-source virtualized-and-unified file system 103. Although the replication-source virtualized-and-unified file system 103 and the replication-destination virtualized-and-unified file system 104 have the same structures, the replication-destination virtualized-and-unified file system 104 is set such that it is not accessed by the clients 100 and 101. Specifically, the replication-source virtualized-and-unified file system 103 is not registered in the exports file. In addition, the values of setup information on replication, which will be described later, are different in the replication-destination virtualized-and-unified file system 104. Furthermore, the replication-source virtualized-and-unified file-system 103 and the replication-destination virtualized-and-unified file system 104 need not have equal overall capacities.

Although the replication destination is a virtualized-and-unified file system similarly to the replication source in the present embodiment, the replication destination may also be a large-capacity network storage provided that it can hold the files and directories as objects to be copied.

Each of the clients 100 and 101 accesses the replication-source virtualized-and-unified file-system 103 using the NFS (Network File System) client program or the CIFS (Common Internet File System) through the network 102. Although only NFS and CIFS are listed as examples for the clients, it is also possible to use other standard file access protocols. Examples of the other file access protocols include AFP (Apple File Protocol) and NCP (Netware Core Protocols).

The network 102 may also be a local area network (LAN) or a wide area network (WAN) provided that it is an IP network.

The replication-source virtualized-and-unified file-system 103 is composed of a unification virtualizing system 110, an internal network 115, and network storages 120 to 122.

Each of the network storages 120 to 122 may be a dedicated apparatus or constructed by mounting a remote control unit on a server, workstation, or a personal computer (PC) each having a storage device and a remote control unit. Although the network storages 120 to 122 are connected to the internal network 115 in the present embodiment, they may also be connected to the network 102.

The network storage 120 is composed of a remote control unit 130 and a storage device 140. Each of the network storages 121 and 122 has the same structure as the network storage 120.

The remote control unit 130 is connected to the internal network 115 to receive a mount request, a file create request, a read request, and a write request each from the clients 100 and 101 or perform the creation of a directory, the removal of a directory, or the like. Mounting is a process to use a file system in a network storage accessed via a network as a part of a file system in a client computer. The mounting process allows the client to access storage devices distributed over the network as if they were the local file systems of the client. The remote control unit 130 communicates with the clients 100 and 101 by using a standard file access protocol such as NFS or CIFS. If the NFS protocol is used, e.g., the well-known mountd and nfsd are used.

Each of the clients 100 and 101 issues a file access request to the storage device by using a file handle. The file handle is an identifier for a file object and guaranteed for its uniqueness to all files. The file object is either a file or a directory. The file handle includes the i-node number of a parent directory and the i-node number of a file object.

Examples of an access request to a file or directory defined by the NFS protocol include a LOOKUP request for acquiring a file handle by giving a file name, a CREATE request for creating a file, a READ request for reading a file, a WRITE request for writing a file, a SETATTR request for setting the attributes of a file, a GETATTR request for reading the attributes of a file, a REMOVE request for removing a file, a RENAME request for changing the name of a file, an MKDIR request for creating a directory, a READDIR request for reading a directory, and a RMDIR request for removing a directory. Of the foregoing examples, the CREATE request, the WRITE request, the SETATTR request, the REMOVE request, the RENAME request, the MKDIR request, and the RMDIR request are updating file access requests. Besides, a LINK request and a SYMLINK request can be named as updating file access requests.

A remote control unit 130 receives a file access request from either of the clients by using, as an argument, a file handle obtained as a result of processing the mount request or the LOOKUP request, processes each of the requests, and returns the results to the client.

In the case of using the CIFS protocol, the well-known Samba or the like may be used appropriately. It is assumed in the present embodiment that each of the clients 100 and 101 accesses the replication-source virtualized-and-unified file system 103 by using the NFS protocol.

The storage device 140 is formatted by using a file system supported by an operating system. Examples of operating systems of the UNIX (registered trademark) type include Solaris commercially available from SUN Microsystems, AIX commercially available from International Business Machines Corporation, HP-UX commercially available from Hewlett-Packard Company, Linux, and FreeBSD.

The unification virtualizing system 110 manages the network storages 120 to 122 in a virtually unified manner. Then it provides a unified-file-system view for the clients 100 and 101. That is, a single files-and-directories tree structure is shown to the clients 100 and 101. The present embodiment is characterized in that, when an administrator transmits a file access request for a file preset as an object to be copied to the unification virtualizing system 110, the unification virtualizing system 110 concurrently transfers the access request in real time to any of the network storages in the replication-source virtualized-and-unified file system 103 and to the replication-destination virtualized-and-unified file system 104. In the case where the file access request is for a directory, on the other hand, the unification virtualizing system 110 transfers the access request in real time to each of the network storages in the replication-source virtualized-and-unified file system 103 and to the replication-destination virtualized-and-unified file system 104.

The unification virtualizing system 110 is composed of: a management unit 150; a request reception unit 151; a replication unit 152; a judgment unit 153; a mapping unit 154; a host table 155; a replication host table 156; a unified management directory 157; and a capacity management table 158.

Although the unification virtualizing system 110 does not have a remote control unit or a storage device in the present embodiment, the unification virtualizing system 110 may also include a remote control unit or a storage device.

The management unit 150 resides in the unification virtualizing system 110 and sets such basic setup information as an IP address, name information such as host names, and a mount point in response to a management request from the clients 100 and 101. Other items included in the basic setup information are a time, an account, security information, and the like. As examples of file access operation performed via the management unit 150, there are a process of creating a new shared directory and a process of changing a permission to a directory or a file.

When the plurality of network storages are virtually unified or file replication is performed between the plurality of virtualized-and-unified file systems, the management unit 150 rewrites the contents of the host table 155, the replication host table 156, the unified management directory 157, and the capacity management table 158. The management unit 150 also rewrites setup information set to the replication unit 152. The setup information will be described later in detail. The management unit 150 also involkes the request reception unit 151, the replication unit 152, and the mapping unit 154 and processes a file access request.

When file replication is performed between the plurality of virtualized-and-unified file system, the management unit 150 manages the respective disk capacities of the individual virtualized-and-unified file systems and the respective amounts of disk use thereof in a unified manner. The management unit 150 also checks whether or not the plurality of virtualized-and-unified file systems are normally functioning every time at constant intervals. The management unit 150 further checks whether or not the files-and-directories structure of the unified management directory 157 and that of each of the network storages 120 to 122 match in the virtualized-and-unified file systems and, in the case of an inconsistency, makes them to consistent. The management unit 150 also checks whether or not the respective files-and-directories structures of the plurality of virtualized-and-unified file systems consistent and, in the case of an inconsistency, makes them to consistent. The management unit 150 will be described later in detail.

The administrator accesses the management unit 150 by using a well-known Web browser on the clients 100 and 101 as a user interface. It is also possible to mount a dedicated user interface on the clients and use it. Alternatively, it is also possible to connect a console to the unification virtualizing system 110 and use it. A Web server is installed on the unification virtualizing system 110 such that it is accessed by using a Web browser or the like. As the Web server, the well-known Apache or the like is used appropriately. In the present embodiment, the management unit 150 performs settings for constructing each of the virtualized-and-unified file systems from the plurality of network storages and simultaneously performs settings for file replication between the plurality of virtualized-and-unified file systems.

The request reception unit 151 processes the mount request from the clients 100 and 101, while receiving a file access request from the clients 100 and 101 and transferring the file access request to the replication unit 152. In the present embodiment, each of the clients 100 and 101 accesses the request reception unit 151 by using the NFS protocol described above. It is assumed that a file access is also performed between the unification virtualizing system 110 and the network storages 120 to 122 by using the NFS protocol. If the client is a CIFS client, the request reception unit 151 is accessed by using the CIFS protocol. In that case, a file access between the request reception unit 151 of the unification virtualizing system 110 and the network storages 120 to 122 uses the NFS protocol. As for a file access using the CIFS protocol, it can be implemented by using a well-known technology such as Samba so that the detailed description thereof will not be given herein.

In another embodiment, there may be adopted a method which uses a protocol suitable for IP storage, such as the iSCSI protocol, between the clients and the unification virtualizing system or between the request reception unit 151 and the storage devices of the network storages 120 to 122.

The replication unit 152 includes the judgment unit 153 and is invoked by the request reception unit 151. The replication unit 152 accesses the unified management directory 157 and judges whether or not replication should be performed in response to the file access request transferred from the request reception unit 151 by using the judgment unit 152. If it is judged that replication should be performed, the replication unit 152 simultaneously transfers the file access request to any of the network storages belonging to the replication-source virtualized-and-unified file system 103 as a target of the file access request and to the unification virtualizing system 111 of the replication-destination virtualized-and-unified file system 104. The judgment unit 152 will be described later in detail. The unified management directory 157 will also be described later.

Figures 2, 3, 4:
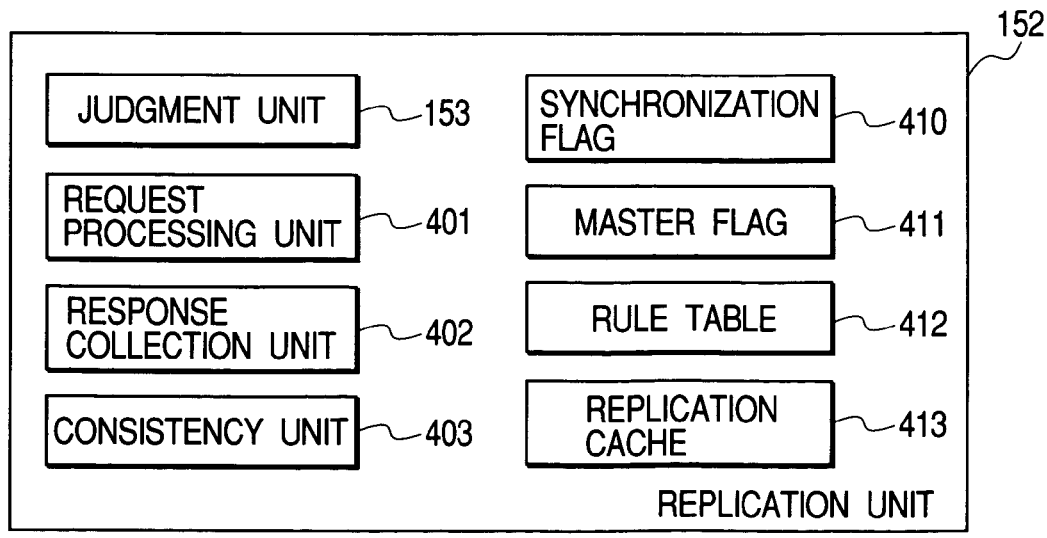
FIG. 2 is a view showing a structure of a host table 155 in the foregoing embodiment.
FIG. 3 is a view showing a structure of a replication host table 156 in the foregoing embodiment.
FIG. 4 is a functional block diagram showing a structure of a replication unit 152 in the foregoing embodiment.

The host table 155 keeps the member information of the virtualized-and-unified file system 103. FIG. 2 shows a structure of the host table 155. The host table 155 associates the name information of network storages which will become the members of the virtualized-and-unified file system 103 with network storage identifiers which are unique to the members. The row 201 shows the name information of the storage devices of the network storages which will become the members. The row 202 shows the respective mount points of the storage devices. The row 203 shows the identifiers corresponding to the respective storage devices of the individual network storages. If a plurality of storage devices are present in one network storage, different identifiers are prepared in correspondence with the individual storage devices. In FIG. 2, PS1, PS2, and PS3 are set as the respective network storage identifiers for the network storages 120 (NS120), 121 (NS121), and 122 (NS122). The host table 155 may further hold root file handles for the individual storage devices.

Although the unification virtualizing system 110 does not have a remote control unit or a storage device in the present embodiment, if it has a remote control unit or a storage device, the name information of the unification virtualizing system 110, the mount point of the storage device, and an identifier for the storage device may be registered appropriately in the host table 155.

The replication host table 156 manages the member information of the replication-destination virtualized-and-unified file systems. FIG. 3 shows the structure of the replication host table 156. The structure of the replication host table 156 is the same as that of the host table 155 except that the replication host table 156 manages not the individual network storage devices belonging to the virtualized-and-unified file system but the virtualized-and-unified file systems themselves. The row 301 manages the name information of the virtualized-and-unified file systems which will become replication members. The row 302 manages the respective mount points of the virtualized-and-unified file systems. The row 303 manages identifiers for the individual virtualized-and-unified file systems. In FIG. 3, VFS1 is set as the identifier for the virtualized-and-unified file system 104 (VFS103). In the case of creating copies of files and directories in one or more virtualized-and-unified file systems, they may be added appropriately to the replication host table 156. Although the replication-destination virtualized-and-unified file system is managed by using the replication host table 156 in the embodiment of the present invention, the host table 155 may also contain the name information and mount points of the replication-destination virtualized-and-unified file systems. Alternatively, the root file handle of the replication destination may also be contained in addition to the name information and the mount point.

The unified management directory 157 manages only the files-and-directories tree structure of the entire virtualized-and-unified file system 103 including the network storages 120 to 122 and all the file identifiers (they include attribute information) Although the unified manage directory 157 provides the files-and-directories tree structure for the clients, each of the files in the unified management directory 157 does not have data as the file entity. All data are stored in distributed relation in the network storages 120 to 122.

In the present embodiment, a file system is used as the unified management directory 157 for virtually showing a single files-and-directories tree structure to the clients. A general file system stores not only a files-and-directories tree structure and file identifiers but also data as the file entities. In view of this, the unification virtualizing system 110 generates dummy files in the file system of the unified management directory 157. Each of the dummy files does not have data as the file entity.

The capacity management table 158 keeps information on the respective amounts of disk use of the replication-source and replication-destination virtualized-and-unified file systems 103 and 104 and information on the respective disk capacities thereof. FIG. 7 shows a structure of the capacity management table. In the embodiment of the present invention, there is a case where the virtualized-and-unified file systems have different structures. In that case, if the available disk capacity of the replication-source virtualized-and-unified file system 103 is smaller than the available disk capacity of the replication-destination virtualized-and-unified file system 104, file or directory replication can be performed. If the available disk capacity of the replication-source virtualized-and-unified file system 103 is larger than the available disk capacity of the replication-destination virtualized-and-unified file system 104 or if the replication-destination virtualized-and-unified file system 104 does not have a sufficient available disk capacity, however, replication may not be performed. To guarantee a sufficient disk capacity to allow for replication, the capacity management table 158 manages, of the amounts of disk use and disk capacities of the plurality of virtualized-and-unified file systems, the largest amount of disk use and the smallest disk capacity as an amount of disk use and a disk capacity which allow for replication. The row 701 manages the name information of virtualized-and-unified file systems which become replication members. The row 702 manages the respective amounts of disk use of the individual members. That one of the respective amounts of disk use of the individual members having a maximum value is managed as an amount of disk use of entire replication. The row 703 manages the respective disk capacities of the individual members. That one of the respective disk capacities of the individual members having a minimum value is managed as the disk capacity of entire replication. Although the respective amounts of disk use and respective disk capacities of the individual virtualized-and-unified file systems are managed by using the capacity management table 158, these information items may also be contained in the host table 155 or the replication host table 156.

When the client 100 issues a file create request (which corresponds to the CREATE request in accordance with the NFS protocol) to the unification virtualizing system 110, the replication unit 152 creates a dummy file in the unified management directory 157 and stores the file entity in the file system of any of the network storages 120 to 122. If the client 100 issues a READ request to the unification virtualizing system 110, the request reception unit 151 receives the READ request and transfers it to the replication unit 152. The replication unit 152 accesses the unified management directory 157, specifies the network storage storing therein the file entity by using the dummy file. The replication unit 152 then reads data as the file entity from the specified network storage and returns the read data together with the attribute information managed by the unified management directory 157 to the client. Since it is sufficient for the unified management directory 157 to manage the files-and-directories tree structure and the file identifiers, the use of the file system is not mandatory. A database or a dedicated table also be used as long as it is guaranteed that the file identifiers are unique to all the files.

The mapping unit 154 associates files and the network storages in which the files are stored. In the present embodiment, the mapping unit 154 stores, in the dummy files created in the unified management directories 157, the identifiers for the network storages storing therein the file entities. The network storages identifiers are values unique to the system and are registered in the host table 155. The network storage identifiers to be written in the respective dummy files are determined such that the files are evenly distributed in the individual network storages. Specifically, when a file is newly created in response to a CREATE request, the identifiers for the network storages storing therein the file entities are determined in a round-robin manner. Otherwise, the network storages may also be determined such that their respective storage capacities become equal by monitoring the capacities of the individual network storages. Alternatively, it is also possible to allocate all files which belong to a specified directory to the same network storage.

Although the present embodiment has adopted a method in which the identifiers for the network storages storing therein the file entities are stored in the dummy files, it is also possible to provide not the dummy files but an additional list for associating the names of files kept in each of the directories with the identifiers for the network storages storing therein the entities of the individual files. A dedicated table or any other method may be used if the network storages storing therein the file entities can be determined uniquely from the file identifiers. For the identifiers of frequently accessed files, a correspondence between the identifiers for the network storages storing therein the file entities and the file identifiers in the network storages may also be kept in a high-speed memory to specify the network storages storing therein the entities of the individual files at a high speed from the file identifiers of the dummy files. This allows a file access request to be transferred directly to the network storage storing therein the file entity without reading the dummy file.

Figure 11:
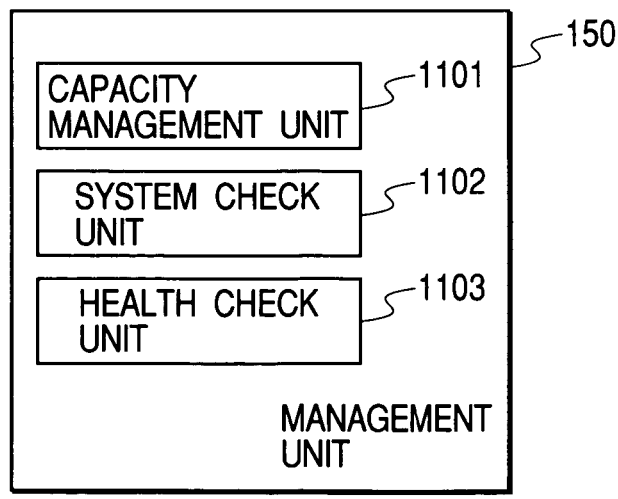
FIG. 11 is a functional block diagram showing a structure of a management unit 150 in the foregoing embodiment.

A detailed description will be given next to the management unit 150. FIG. 11 shows a structure of the management unit 150. The management unit 150 is composed of a capacity management unit 1101, a system check unit 1102, and a health check unit 1103.

The capacity management unit 1101 manages the respective amounts of disk use and respective disk capacities of the replication-source and replication-destination virtualized-and-unified file systems by using the capacity, management table 158. It ensures a sufficient available disk capacity which allows for replication. The capacity management unit 1101 periodically issues a file access request for acquiring the disk capacity and the amount of disk use to each of the replication-source and replication-destination virtualized-and-unified file systems and records the acquired disk capacity and amount of disk use in the capacity management table 158. In the case of using, e.g., the NFS protocol, a STATFS request can be named as a file access request for acquiring a disk capacity and an amount of disk use. If the client attempts to write a file in excess of the available disk capacity which allows for replication and managed by the capacity management table 158, the capacity management unit 1101 returns a write error to the client.

The system check unit 1102 judges whether or not the files-and-directories structure of the unified management directory 157 in the virtualized-and-unified file system 103 and the files-and-directories structure in each of the network storages 120 to 122 maintain consistency and, in the case of a inconsistency, make them to consistent. The system check unit 1102 also judges whether or not the files-and-directories structure of the unified management directory 157 in the replication-source virtualized-and-unified file system 103 and the files-and-directories structure of the unified management directory 167 in the replication-destination virtualized-and-unified file system 104 maintain consistency and, in the case of an inconsistency, makes them to consistent. A consistency or inconsistency can be determined by issuing, e.g., the LOOKUP request in accordance with the NFS protocol, acquiring the attribute information thereof, and comparing. If an inconsistency is fixed, the system check unit 1102 writes a correction record in a log.

The health check unit 1103 judges whether or not each of the replication-source virtualized-and-unified file system 103 and the replication-destination virtualized-and-unified file system 104 is operating normally. In the embodiment of the present invention, the health check unit 1103 performs different processings with respect to the replication-source virtualized-and-unified file system and the replication-destination virtualized-and-unified file system. Whether or not the virtualized-and-unified file system is at the replication source can be determined by checking the master flag 411 of the replication unit 152. The master flag 411 will be described later in detail. The replication-source virtualized-and-unified file system 103 issues file access requests to the replication-destination virtualized-and-unified file system at constant intervals. In the case of the file access requests in accordance with the NFS protocol, e.g., the STATFS requests or the like are used. The health check unit 1103 of the replication-source virtualized-and-unified file system checks responses from the replication-destination virtualized-and-unified file system at given time intervals. If a response to the issued file access request is an error or a response cannot be obtained within a given time period, the health check unit 1103 judges that trouble has occurred in the replication-destination virtualized-and-unified file system and sends an e-mail alert to notify the trouble or the like to the administrator.

The health check unit 1103 of the replication-destination virtualized-and-unified file system checks file access requests received at constant time intervals, i.e., FSSTAT requests. Since these file access requests for health checking are issued from the replication destination at constantly equal time intervals, if an FSSTAT request is not transferred even after a elapse of a given time, the health check unit 1103 judges that trouble has occurred in the replication-source virtualized-and-unified file system and sends an e-mail alert to inform the trouble or the like to the administrator.

Although the embodiment of the present invention has judged whether or not each of the replication-source and replication-destination virtualized-and-unified file systems is normal by using the FSSTAT requests, health checking may also be implemented by installing another application program. Any other method may be used provided that it allows the judgment of whether or not a plurality of virtualized-and-unified file systems are normally operating.

The replication unit 152 will be described next in detail with reference to FIG. 4. The replication unit 152 is composed of: the judgment unit 153, a request processing unit 401; a response collection unit 402; a consistency unit 403; a synchronization flag 410; the master flag 411; a rule table 412; and a replication cache 413.

The judgment unit 153 is invoked by the request reception unit 151 and judges whether or not replication should be performed in response to the file access request received by the request reception unit 151. In the present embodiment, replication is performed if four AND conditions are satisfied, which are: the file access request received by the request reception unit 151 is an updating request; the synchronization flag 410 has been set; the master flag 411 has been set; and the file access request is for an object to be copied. The synchronization flag 410 and the master flag 411 will be described later. If the file access request is a referencing request such as READ, the access request is not transferred to the replication-destination virtualized-and-unified file system 104. If the value of the synchronization flag is "FALSE", the request is not transferred to the replication-destination virtualized-and-unified file system 104. The access request is not also transferred if the value of the master flag 411 is "FALSE". The access request is not also transferred if the file access request is not for an object to be copied.

If the judgment unit 153 has judged that replication should be performed, the request processing unit 401 simultaneously transfers the file access request received by the request reception unit 151 to the network storages 120 to 122 belonging to the replication-source virtualized-and-unified file system 103 and to the unification virtualizing system 111 of the replication-destination virtualized-and-unified file system 104. If the judgment unit 153 has judged that replication should not be performed, the file access request received by the request reception unit 151 is transferred only to the network storages 120 to 122 belonging to the replication-source virtualized-and-unified file system 103.

If it has been judged that replication should be performed, the request processing unit 401 also guarantees the order in which the file access request is processed in the replication-source virtualized-and-unified file system and in the replication-destination virtualized-and-unified file system.

The response collection unit 402 collects responses from the network storages 120 to 122 belonging to the replication-source virtualized-and-unified file system 103 and from the replication-destination virtualized-and-unified file system 104 and returns the collected responses as one response to the client.

The consistency unit 403 is invoked by the management unit 150 shown in FIG. 1 and maintains consistency between files and directories as objects to be copied in the replication-source virtualized-and-unified file system 103 and copied files and directories in the replication-destination virtualized-and-unified file system 104. Specifically, it is examined whether or not the files and directories as the objects to be copied at the replication source and the copied files and directories at the replication destination maintain consistency and, in the case of an inconsistency, the contents of the replication-source virtualized-and-unified file system 103 are reflected as the latest information in the replication-destination virtualized-and-unified file system 104.

The synchronization flag 410 is set by the consistency unit 403 and indicates whether or not the files and directories as the objects to be copied in the replication-source virtualized-and-unified file system 103 and the copied files and directories in the replication-destination virtualized-and-unified file system 104 maintain consistency. The synchronization flag 410 is set to "FALSE" at the time of initialization. The synchronization flag 410 is set to "TRUE" in the case of a consistency and set to "FALSE" in the case of an inconsistency.

The master flag 411 is set by the management unit 150 and indicates that the files and directories in the replication-source virtualized-and-unified file system 103 are masters. The master flag 411 is set to "FALSE" at the time of initialization. The master flag 411 of the replication unit 152 in the replication-source virtualized-and-unified file system 103 is set to "TRUE", while the master flag 411 of the replication unit 162 in the replication-destination virtualized-and-unified file system 104 that has been registered in the replication host table 156 is set to "FALSE".

The rule table 412 is set by the management unit 150 and holds an entire specified directory as an object to be copied, a specified user identifier, or a specified group identifier. Alternatively, the rule table 412 keeps an identifier for a file as an object to be copied. If the administrator sets the copying of a file owned by a specified user, an identifier for the user is stored in the rule table 412. If all the files belonging to the replication-source virtualized-and-unified file system 103 are copied to a target, a copy flag may be prepared appropriately instead of the rule table 412. Alternatively, a rule for copying all the files and directories may also be described in the rule table 412. It is also possible to use the rule table 412 an the copy flag in combination.

In the case of changing, depending on a file identifier, the replication-destination virtualized-and-unified file system for holding a copy of the file, the file may be associated appropriately with the identifier for the replication-destination virtualized-and-unified file system set to the replication host table 156 in accordance with each rule in the rule table 412. This allows, when there are a plurality of replication-destination virtualized-and-unified file systems, creation of a copy of the file under conditions different from one virtualized-and-unified file system to another. In the case of changing the replication-destination virtualized-and-unified file system for each of file identifiers, the provision of respective synchronization flags corresponding to the individual members of the replication host table 156 allows creation of a partial copy of the file system under more detailed conditions.

The replication cache 413 stores, a correspondence between an identifier for a frequently accessed dummy file in the unified management directory of the replication-source virtualized-and-unified file system and an identifier of a dummy file in the unified management directory of the replication-destination virtualized-and-unified file system. It is kept in a memory. When the correspondence is recorded in the replication cache 413 and when the client accesses the replication-source virtualized-and-unified file system by using a file identifier and also creates a copy of the file in the replication-destination virtualized-and-unified file system, a direct access can be made to the unified management directory of the replication-destination virtualized-and-unified file system. Although the embodiment of the present invention has the cache for holding a correspondence between the identifier for a dummy file in the virtualized-and-unified file system and a file identifier in the network storage holding-therein the entity of the file, the cache may also contain information kept in the replication cache.

Although the present embodiment has adopted a method in which conditions for copying are kept in the rule table 412, a copy identifier indicating whether or not copying should be performed may also be kept in each of dummy files in the unified management directory 157, not in the rule table 412. Alternatively, each of the directories may also be provided with an additional list for associating files kept in the directory with the copy identifiers. A dedicated table and any other method may be used provided that it can be determined uniquely from the file identifiers whether or not the files are objects to be copied.

Since the structure of the replication-destination virtualized-and-unified file system 104 is the same as that of the replication-source virtualized-and-unified file system 103, the detailed description thereof will be omitted. In the present embodiment, however, the replication-destination virtualized-and-unified file system is not registered in the replication host table 166 of the replication-destination virtualized-and-unified file system 104. In addition, each of the values of the synchronization flag and the master flag used by the replication unit 162 is set to "FALSE". The setting of these values may be performed through the use of the management unit 150 of the replication-source virtualized-and-unified file system 103 or through a direct access by the administrator to the management unit 160 of the replication-destination virtualized-and-unified file system 104.

A detailed description will be given next to the replication process performed by the replication unit 152 with reference to FIG. 5. Upon receipt of a file access request from either of the clients, the request reception unit 151 invokes the replication unit 152 such that the replication process is performed.

The replication process is composed of judgment processing 510, request transfer processing 511, and response collection processing 512.

The judgment processing 510 judges, in Process 502, whether or not replication should be performed in response to the file access request received by the request reception unit 151. In the case of performing replication, Process 504 of the request transfer processing 411 is performed, while Process 503 thereof is performed in the case of not performing replication. The judgment processing 510 will be described later in detail.

The request transfer processing 511 performs Process 503 or Process 504 depending on the result of the judgment in Process 502. Process 503 is performed when the result of the judgment in the judgment processing 510 is "YES" and transfers the file access request to the network storage storing therein the file entity registered in the host table 155 of the replication-source virtualized-and-unified file system 103, while also transferring the file access request to the virtualized-and-unified file system 104 registered in the replication host table 156. In the case of a directory access request, the present embodiment transfers the file access request for the directory to each of the network storages belonging to the replication-source virtualized-and-unified file system 103, while transferring the file access request to the virtualized-and-unified file system 104 registered in the replication host table 156.

Process 504 is performed when the result of the judgment in the judgment processing 510 is "NO" and transfers the file access request only to the network storage storing therein the file entity registered in the host table 155 of the replication-source virtualized-and-unified file system 103. In the case of a directory, the access request is transferred to each of the network storages belonging to the replication-source virtualized-and-unified file system 103.

The response collection processing 512 collects responses in the request transfer processing 511 and returns the collected responses as one response to the client. Process 505 is performed when the result of the judgment in the judgment processing 510 is "YES". In the case of a file access request, a response from the file-storing network storage in the replication-source virtualized-and-unified file system 103 and a response from the replication-destination virtualized-and-unified file system 104 are returned collectively as one response to the client 100. In the case of a directory access request, responses from all the network storages in the replication-source virtualized-and-unified file system 103 and a response from the replication-destination virtualized-and-unified file system 104 are returned collectively as one response to the client 100.

Process 506 is performed when the result of the judgment in the judgment processing 510 is "NO". In the case of a file access request, a response from the file-storing network storage in the replication-source virtualized-and-unified file system 103 is returned to the client 100. In the case of a directory access request, responses from all the network storages in the replication-source virtualized-and-unified file system 103 are returned collectively as one response to the client 100.

Although the present embodiment has shown an example in which the response collection processing 512 waits for the arrival of all the responses from the network storage and virtualized-and-unified file system as the destinations of the transferred access request and then returns the responses to the client, it is also possible to return, to the client 100, the earliest one of responses received from a plurality of destinations of the transferred access request without waiting for the arrival of the other responses and thereby reduce a response time for the client. Alternatively, it is also possible to wait for the arrival of all the responses from a plurality of destinations of the transferred access request and a response from the replication unit 152 which has accessed the unified management directory 157 in response to a next file access request and then returns the responses to the client. In the case of adopting the method in which the arrival of all the responses from the network storage and virtualized-and-unified file system as the destinations of the transferred access request is awaited, error processing if any of the responses vanishes is easy but overhead for waiting for the responses is large. In the case of receiving the earliest response and then returning it to the client 100 without waiting for the arrival of the other responses, on the other hand, file access performance comparable to that when replication is not performed is obtainable but error handling becomes difficult. A waiting method should be determined selectively by considering a trade-off between performance and the intricacy of error handling.

A description will be given next to the detailed flow of the judgment processing 510 with reference to FIGS. 1, 4, and 6. Upon receipt of a file access request, the request reception unit 151 invokes the judgment unit 153. The judgment unit 153 performs the judgment processing 510. The judgment processing 510 judges, in Process 602, whether or not the file access request is an updating request. In the case of an updating request, "YES" is given as a result of the judgment and Process 603 is performed.

In Process 603, it is examined whether or not the files and directories as objects to be copied are original by examining the master flag 411. If the value of the master flag 411 is "TRUE", the result of the judgment becomes "YES" and Process 604 is performed.

In Process 604, it is examined whether or not the files and directories as objects to be copied and copied files and directories in the replication-destination virtualized-and-unified file system match by examining the synchronization flag 410. If the value of the synchronization flag 410 is "TRUE", the result of the judgment becomes "YES" and Process 605 is performed.

Process 605 judges whether or not a file object to be accessed in response to the file access request is an object to be copied. Process 605 is composed of Processes 609 and 610. In Process 609, if the file object to be accessed in response to the file access request is a directory, "YES" is given as a result of the judgment indicative of an object to be copied and Process 606 is performed. If the file object as a target of the file access request is a file, Process 610 is performed. Process 610 judges whether or not the file object to be accessed satisfies the copying conditions in the rule table 412 shown in FIG. 4. In the judgment, the unified management directory 157 is accessed, the attribute information of the file is acquired, and the acquired attribute information is compared with the copying conditions in the rule table 412. If the copying conditions are satisfied, "YES" is given as a result of the judgment and Process 606 is performed. If the copying conditions are not satisfied, "NO" is given as a result of the judgment indicative of a file not to be copied and Process 607 is performed.

In the present embodiment, if the file object as a target of the file access request is a directory, it is inevitably judged to be an object to be copied. Accordingly, the replication-source virtualized-and-unified file system and the replication-destination virtualized-and-unified file system have the same directory structures. The arrangement facilitates consistency processing at the time of trouble recovery. Even in the case of the directory access request, a method which individually selects whether or not the file object is an object to be copied can easily be implemented not only for a file but also for a directory by judging whether or not the copying conditions are satisfied by using the rule table 412. In the case of copying the entire virtualized-and-unified file system 103 by using the copy flag, the judgment of whether or not copying should be performed may be performed appropriately in Process 605 by examining whether or not the value of the copy flag is "TRUE" irrespective of a file or a directory.

In Process 606, "YES" is given as a result of the replication judgment, whereby the judgment processing 510 is ended. If the result of the judgment in any of Processes 602, 603, 604, and 605 is "NO", Process 607 is performed and "NO" is given as a result of the replication judgment, whereby the judgment processing 510 is ended.

A detailed description will be given next to the processing of a file access request in the request transfer processing 511 and the response collection processing 512 when the result of the replication judgment is "YES". If the result of the judgment for the file access request received by the replication unit 152 is "YES" in the judgment processing 510, the present embodiment transfers the access request not only to the replication-source virtualized-and-unified file system 103 but also to the replication-destination virtualized-and-unified file system 104. For the processing of the file access request, the NFS protocol is used. The updating requests in the NFS Version 2 include the CREATE request, the WRITE request, the REMOVE request, the RENAME request, the MKDIR request, the RMDIR request, the SETATTR request, the LINK request, and the SYMLINK request.

The description will be given first to a structure of the file handle. The file handle includes the i-node number of a parent directory and the i-node number of a file object.

Next, the processing of an updating request as a target of replication in the present embodiment will be described in detail.

Figure 8:
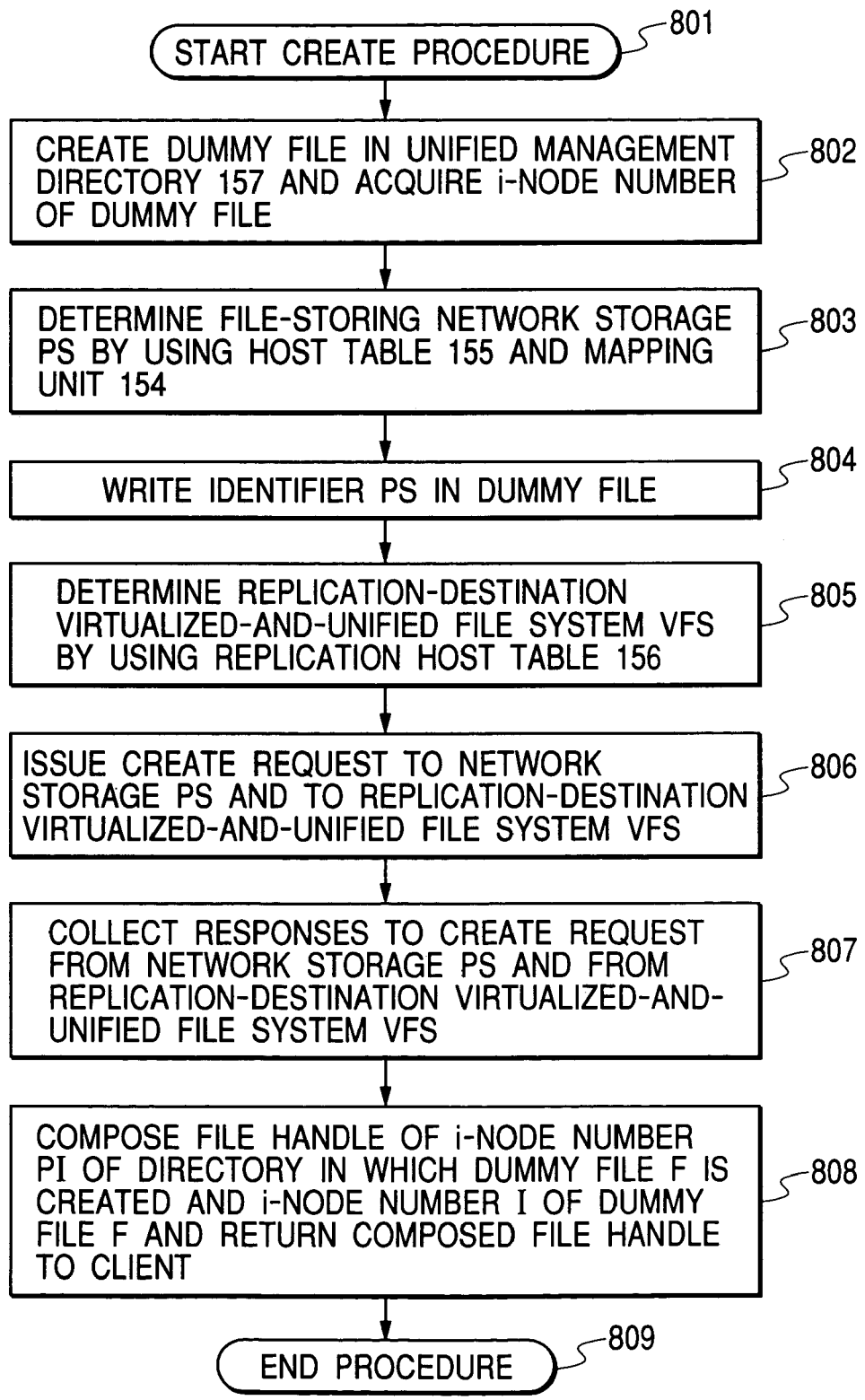
FIG. 8 is a flow chart illustrating a CREATE procedure in the foregoing embodiment.

FIG. 8 shows the flow of a CREATE procedure. The CREATE request uses the file handle H of a directory in which a file is created and the name F of the file as arguments. Upon receipt of the CREATE request from the request reception unit 151, the replication unit 152 of FIG. 1 invokes Process 801.

In Process 802, the i-node number PI of the directory in which the file is created is retrieved from the field 702 of the file handle H and a dummy file with the name F is created in the directory identified with the i-node number PI.

In Process 803, an identifier PS for the network storage storing therein the file as a target of the CREATE request is determined by using the mapping unit 154 and the host table 155.

In Process 804, the identifier PS is written in the dummy file F. For the writing, a WRITE request, e.g., is used.

In Process 805, a replication-destination virtualized-and-unified file system VFS to which the CREATE request is transferred is determined by using the replication host table 156.

In Process 806, the CREATE request sent from the client is issued to the network, storage PS and to the virtualized-and-unified file system VFS.

In Process 807, a response to the CREATE request is collected from each of the network storage PS and the virtualized-and-unified file system VFS.

In Process 808, a file handle 700 is composed of the i-node number PI of the directory in which the dummy file F is created and the i-node number I of the dummy file and returned to the client 100.

Figure 9:
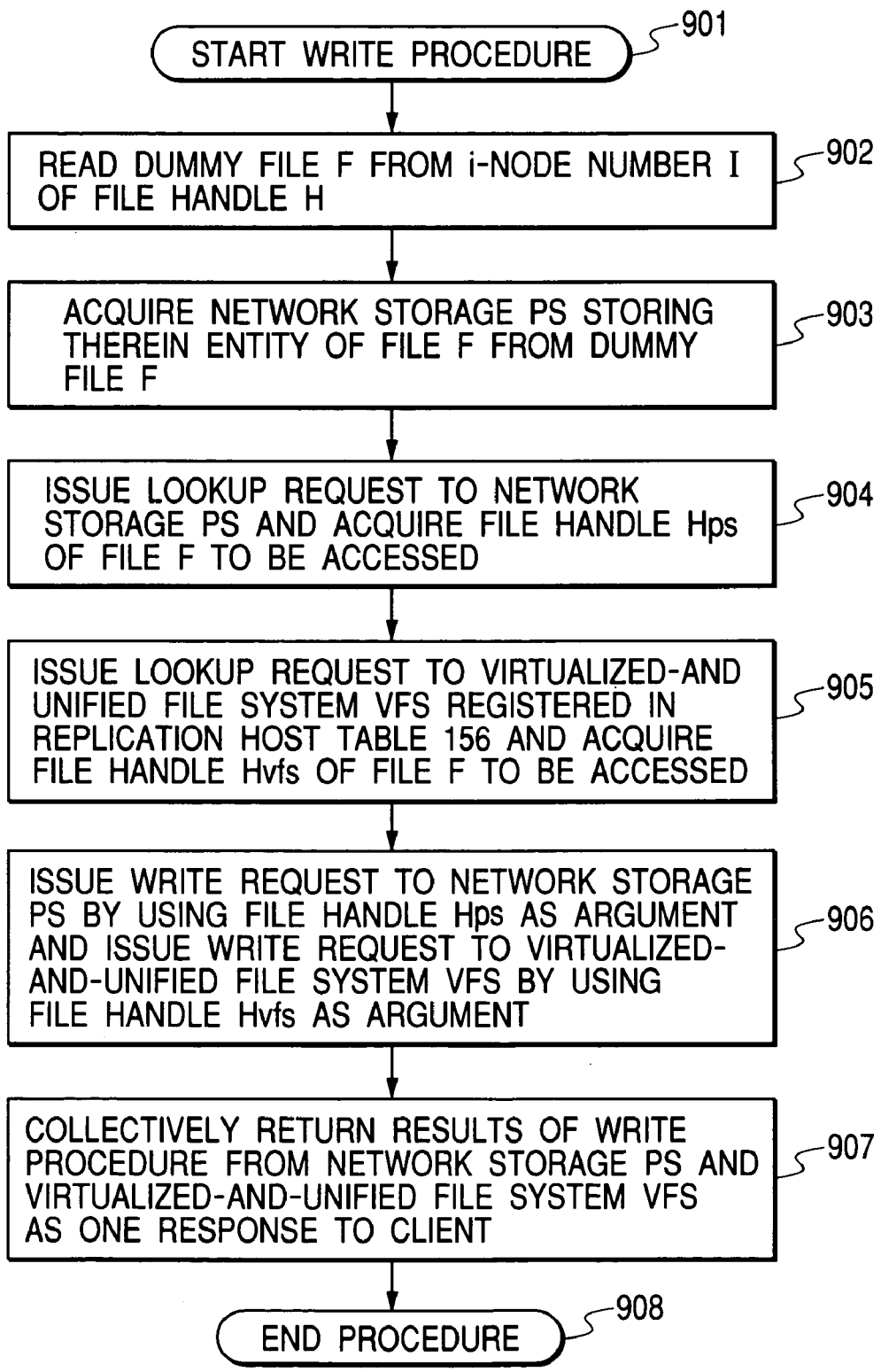
FIG. 9 is a flow chart illustrating a WRITE procedure in the foregoing embodiment.

FIG. 9 shows a WRITE procedure. The WRITE request uses the file handle H of the file F to be read and the file handle Hp of the parent directory of the file F to be read as arguments. As shown in FIG. 1, the replication unit 152 receives the WRITE request from the request reception unit 151, invokes Process 901 in FIG. 9, and performs the WRITE procedure.

In Process 902, the dummy file F is read from the file handle H and the file-storing network storage PS is obtained from the dummy file F.

In Process 903, a file handle Hps for the file entity F is acquired from the network storage PS. The file handle Hps can be acquired by issuing the LOOKUP request to the network storage PS. By recording a correspondence between the value of the file handle Hps once acquired and the file handle H in the unification virtualizing system 110, the file handle Hps in the file-storing network storage PS can be acquired without issuing the LOOKUP request when the WRITE request is issued next by using the file handle H.

In Process 904, a file handle Hvgs for the file entity F is acquired from the virtualized-and-unified file system VFS registered in the replication host table 156. The file handle Hvgs can be acquired by issuing the LOOKUP request to the virtualized-and-unified file system VFS. By recording a correspondence between the value of the file handle Hvfs once acquired and the file handle H in the unification virtualizing system 110, the file handle Hvfs in the replication-destination virtualized-and-unified file system VFS can be acquired without issuing the LOOKUP request when the WRITE request is issued next to the virtualized-and-unified file system VFS by using the file handle H.

In Process 905, the WRITE request is issued to the network storage PS by using the acquired file handle Hps as an argument. The WRITE request is further issued to the replication-destination virtualized-and-unified file system VFS by using the acquired file handle Hvfs of the replication destination as an argument.

In Process 906, the network storage PS and the virtualized-and-unified file system VFS return respective values in response to the WRITE request, the results of which is returned collectively as one response to the client 100.

Since a REMOVE procedure and a RENAME procedure are the same as the WRITE procedure, the detailed description thereof will be omitted.

Figure 10:
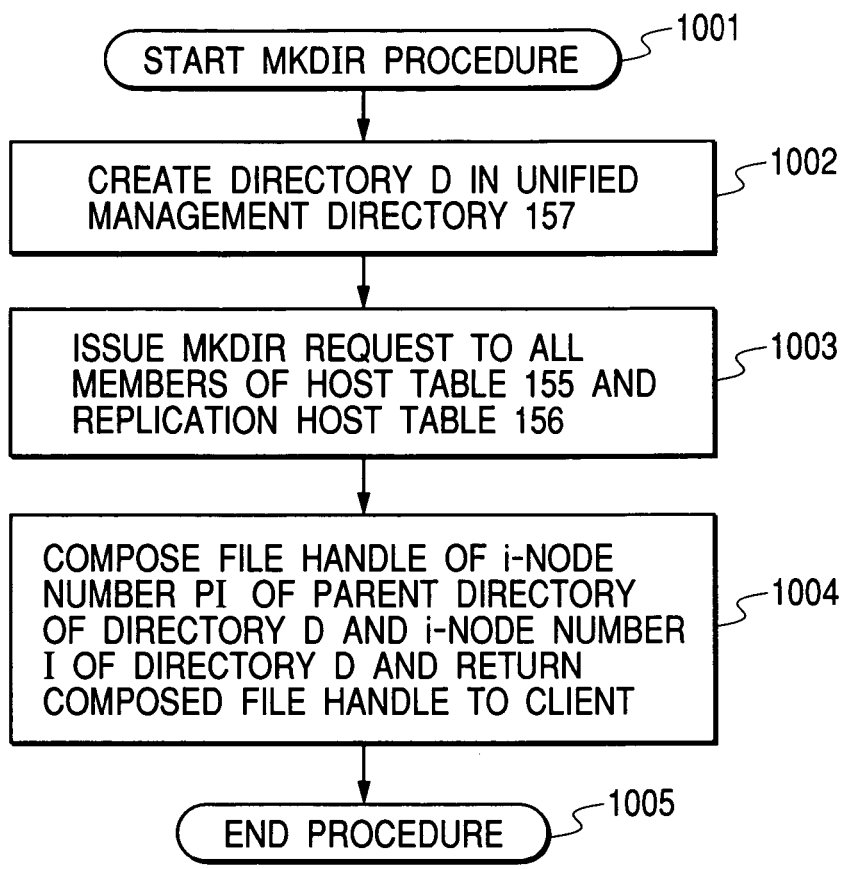
FIG. 10 is a flow chart illustrating an MKDIR procedure in the foregoing embodiment.

FIG. 10 shows the flow of an MKDIR procedure which uses the name D of a directory to be created and the file handle H of a parent directory to be created as arguments. As shown in FIG. 1, the replication unit 152 receives the MKDIR request from the request reception unit 151 and performs Process 1001 in FIG. 10.

In Process 1002, a directory with the name D is created in a directory of the unified management directory 157 identified with the i-node number held in the field 702 of the file handle H. It is assumed that the i-node number of the created directory is I.

In Process 1003, the MKDIR request is issued to each of the network storages registered in the host table 155 and to each of the virtualized-and-unified file systems registered in the replication host table 156 so that a directory with the name D is created.

In Process 1004, when all the responses to the MKDIR request transferred in Process 1003 are received, a file handle is created from the i-node number PI of the parent directory of the directory D and from the i-node number I of the directory D created in the unified management directory 156 and returned to the client 100.

An RMDIR procedure is also the same as the MKDIR procedure. The RMDIR procedure can easily be implemented by changing the MKDIR request to the RMDIR request. An SYMLINK procedure is also the same as the MKDIR procedure provided that the MKDIR request is changed appropriately to the SYMLINK request. As for a SETATTR procedure, it issues the SETATTR request to each of the network storages and the replication-destination virtualized-and-unified file system if the file object to be accessed is a directory and thereby sets directory attributes, similarly to the MKDIR procedure. If the file object to be accessed is a file, the SETATTR procedure can be implemented similarly to the WRITE procedure.

Figure 6:
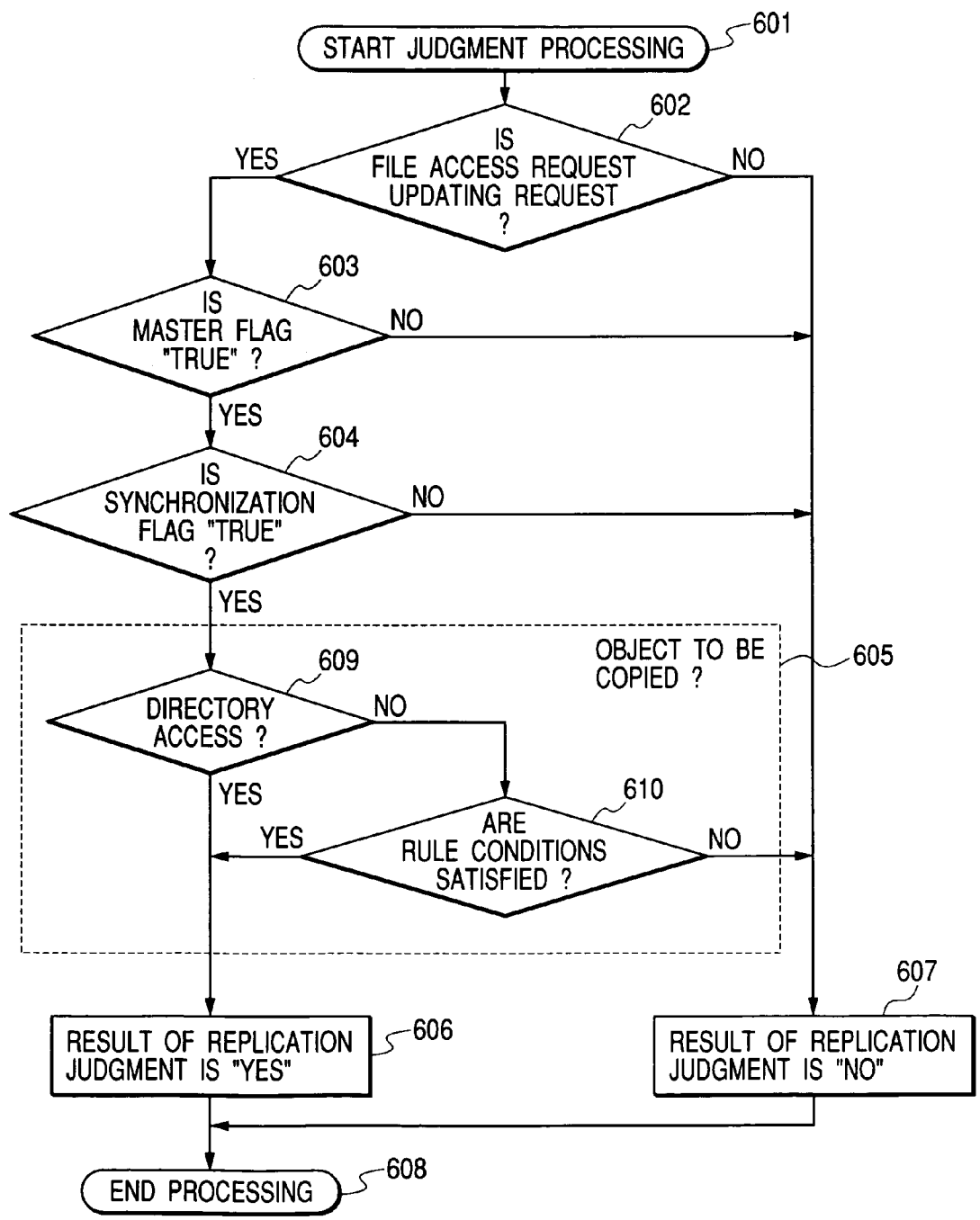
FIG. 6 is a flow chart illustrating judgment processing 510 in the foregoing embodiment.

In the present embodiment, if the file access request from the client is a referencing request, the result of the judgment processing shown in FIG. 6 becomes "NO" so that replication is not performed. Referencing requests in the NFS Version 2 include the LOOKUP request, the READ request, a READLINK request, a READDIR request, the GETATTR request, and the STATFS request.

A description will be given next to the flow of a LOOKUP procedure. The LOOKUP request uses the file handle H of the parent directory of the file object and the name F of the file object as arguments. As shown in FIG. 1, the replication unit 152 receives the LOOKUP request from the request reception unit 151 and performs the following processing.

First, the i-node number PI of the parent directory is retrieved from the file handle H and the i-node number I of a file object with the name F present in the unified management directory 157 identified with the i-node number PI is acquired. Then, the i-node number PI of the parent directory is combined with the i-node number I of the file object F to compose the file handle, which is returned to the client 100.

The READDIR procedure is the same as the LOOKUP procedure, in which information on a target directory is read from the unified management directory 157 and returned to the client 100.

Figure 12:
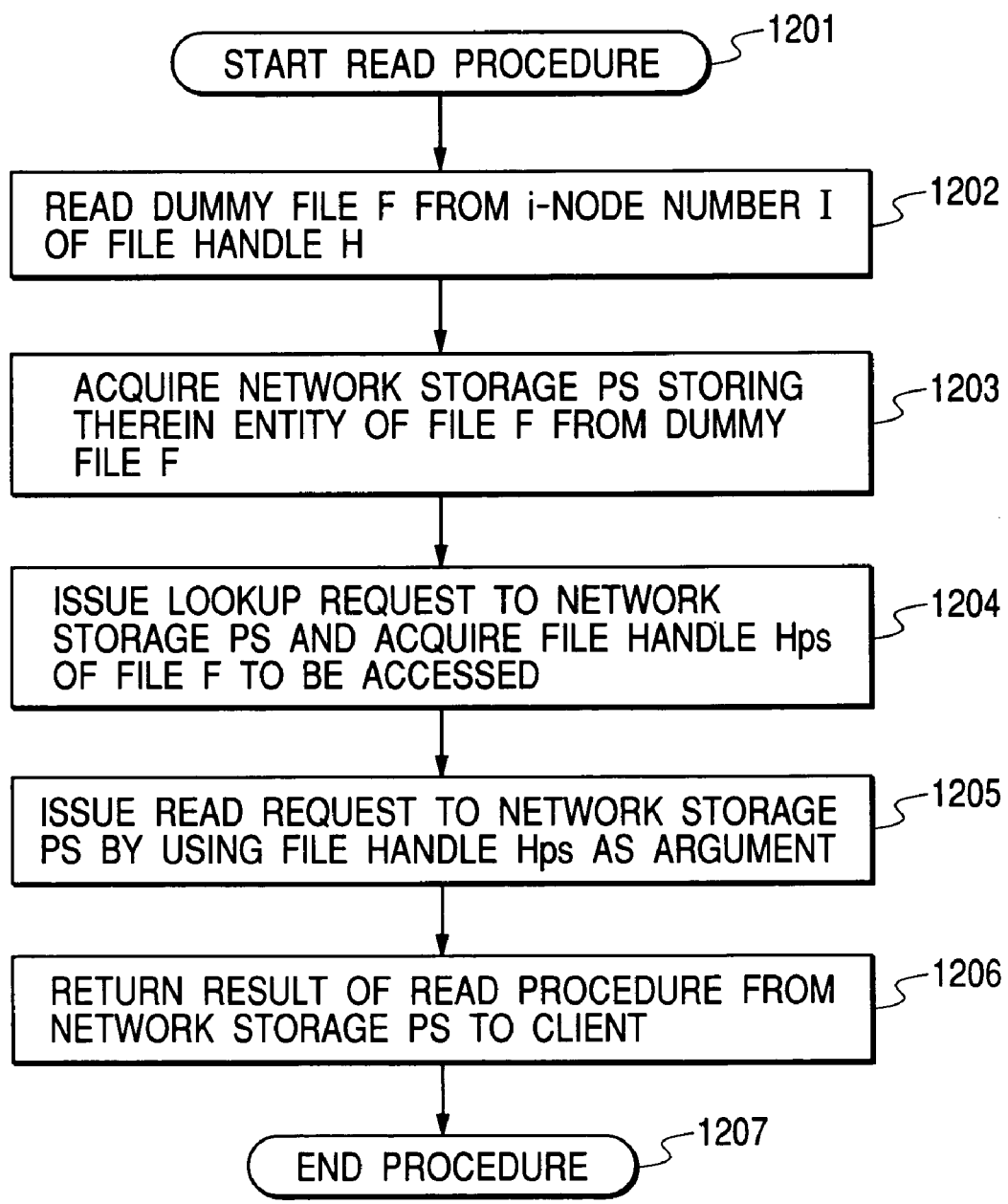
FIG. 12 is a flow chart illustrating a READ procedure in the foregoing embodiment.

FIG. 12 shows the flow of a READ procedure. The READ request uses the file handle H of the file F to be read and the file handle Hp of the parent directory of the file F to be read as arguments. As shown in FIG. 1, the replication unit 152 receives the READ request from the request reception unit 151 and invokes Process 1201 in FIG. 12. In Process 1202, the dummy file F is read from the file handle H and the network storage PS storing therein the file entity is obtained from the dummy file F. In Process 1203, the file handle Hps for the file entity F is acquired from the network storage PS. The file handle Hps can be acquired by issuing the LOOKUP request to the network storage PS. By recording a correspondence between the value of the file handle Hps once acquired and the file handle H in the unified management directory 157, the file handle Hps in the file-storing network storage PS can be acquired without issuing the LOOKUP request when the READ request is issued next by using the file handle H.

In Process 1204, the READ request is issued to the network storage PS by using the acquired file handle Hps as an argument. In Process 1205, the network storage PS returns the result of reading as a value in response to the READ request, which is returned to the client 100.

A GETATTR procedure issues a request to each of the network storages registered in the host table 155 to read directory attributes. If the file object to be accessed is a file, the request may be issued appropriately to the file-storing network storage in the same manner as in the READ procedure shown in FIG. 12.

A detailed description will be given next to the flow of the consistency processing using the consistency unit 403 shown in FIG. 4. In the case where file replication is performed between the replication-source virtualized-and-unified file system 103 and the replication-destination virtualized-and-unified file system 104 as shown in FIG. 1, when trouble occurs in either of the file systems or temporary trouble occurs in the network or the like, the value of the synchronization flag 410 is set to "FALSE" and the replication process is halted. If the client can access the replication-source virtualized-and-unified file system 103, the operation is continued by using only the virtualized-and-unified file system 103. If trouble occurs in the virtualized-and-unified file system 103 and the client cannot access it, the administrator changes the settings such that the replication-destination virtualized-and-unified file system 104 which has only the file to be copied is made available to the client. For example, the exports file in the replication-destination virtualized-and-unified file system 104 is changed.

If the operation is continued by using only the replication-source virtualized-and-unified file system 103, recovery from the temporary trouble in the network is made, and replication is performed again with the replication-destination virtualized-and-unified file system 104, the administrator invokes the consistency unit 403 by using the management unit 150 and maintains the consistency of files and directories to be copied between the plurality of virtualized-and-unified file systems.

When the operation is performed initially by using only the virtualized-and-unified file system 103, the consistency unit 403 adds a new virtualized-and-unified file system 104 as a replication destination and copies all the files and directories as objects to be copied in the virtualized-and-unified file system 104 such that they are used when the operation for replication is newly performed.

Figure 13:
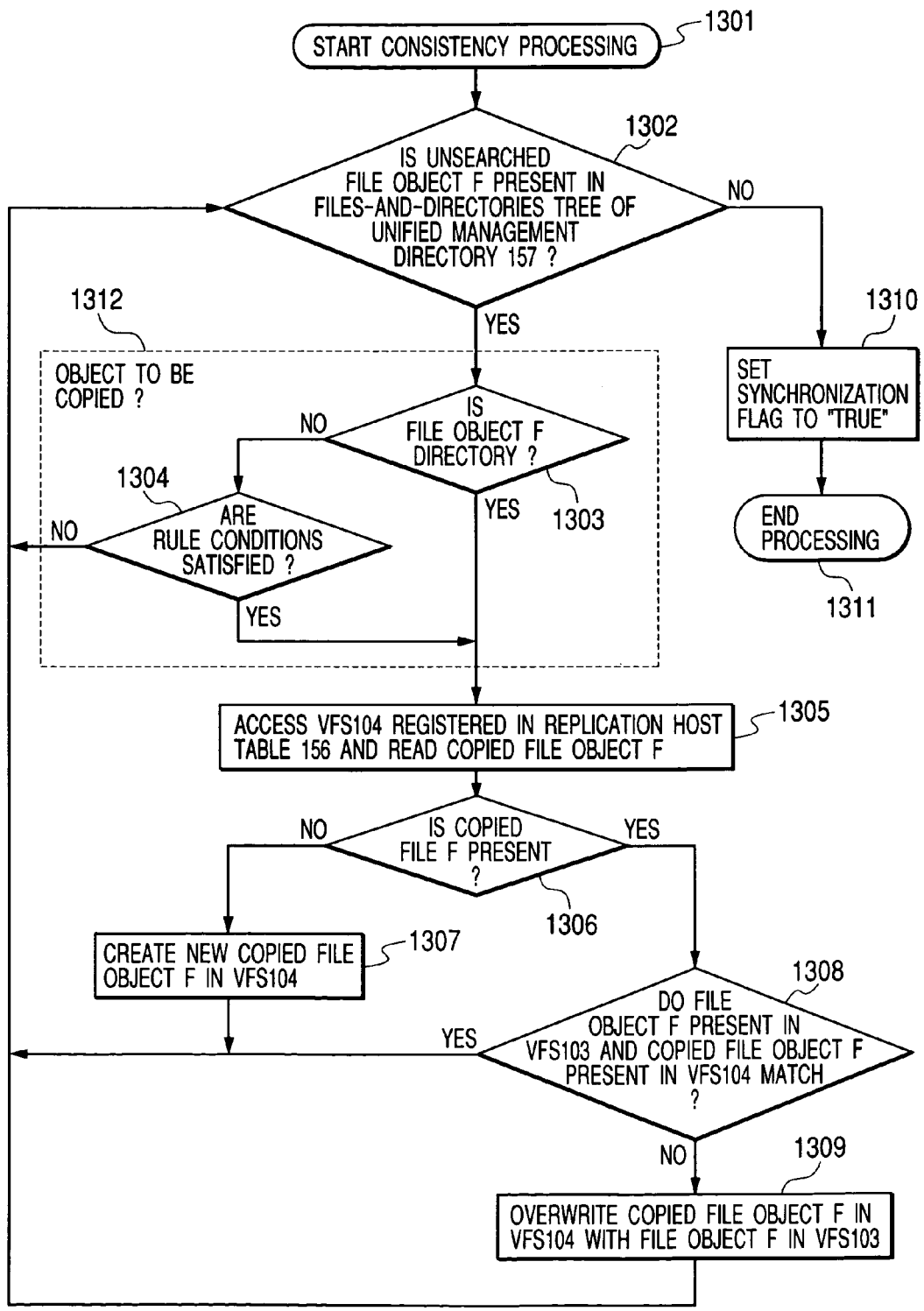
FIG. 13 is a view showing consistency processing in the foregoing embodiment.

FIG. 13 illustrates the flow of the consistency processing. When the administrator issues a consistency request to the management unit 150, the management unit 150 invokes the consistency unit 403 and starts the consistency processing. In Process 1302, it is checked whether or not an unsearched file object F is present in the files-and-directories tree of the unified management directory 157. If the unsearched file object F is present, it is judged in Process 1303 whether or not the unsearched file object F is a directory. If the unsearched file object F is a file, it is examined in Process 1304 whether or not the unsearched file object F satisfies the copying conditions set to the rule table 412. If the copying conditions are not satisfied, there is no need for copying so that the processing returns to Process 1302. If the copying conditions are satisfied, Process 1305 is performed. If the unsearched file object F is a directory in Process 1303, Process 1305 is performed. In Process 1305, the virtualized-and-unified file system 104 (VFS104) registered in the replication host table 156 is accessed so that the copied file object F (copy F) is read. In Process 1306, it is examined whether or not the copy F is present. If the copy F is not present in the virtualized-and-unified file system VFS104, a new copy F is created in the virtualized-and-unified file system VFS104 in Process 1307 and the processing returns to Process 1302. In the case of a file, the creation of the copy F can be accomplished by issuing the CREATE request and the WRITE request to the virtualized-and-unified file system VFS104. If the copy F is present in Process 1306, Process 1308 is performed. In Process 1308, it is examined whether or not the file object F present in the replication-source virtualized-and-unified file system VFS103 and the content of the copy F present in the replication-destination virtualized-and-unified file system 104 (VFS104) maintain consistency. In the case of a consistency, the processing returns to Process 1302. In the case of an inconsistency, the processing overwrites the copied F in the virtualized-and-unified file system VFS 104 with the file object F in the virtualized-and-unified file system 103 and returns to Process 1302. The over writing may be accomplished by issuing the WRITE request to the virtualized-and-unified file system VFS 104. If the unsearched file object F is no more present in Process 1032, Process 1310 is performed. In Process 1310, the synchronization flag of the replication unit 152 is set to "TRUE" by assuming that the files and directories as objects to be copied maintain consistency between the virtualized-and-unified file system VFS103 and the virtualized-and-unified file system VFS104, whereby the processing is ended. The synchronization flag set to "TRUE" enables the replication process to be started in response to the file access request from the client. In the case of creating a copy of each of the file systems in the replication-source virtualized-and-unified file system 103, consistency may be maintained appropriately between all the files and directories in the replication-source virtualized-and-unified file system and those in the replication-destination virtualized-and-unified file system based on whether or not the copy flag is "TRUE" without performing Processes 1303 and 1304.

The present embodiment searches through the files-and-directories tree of the unified management directory 157 and successively examines whether or not the file objects F maintain consistency between the replication-source virtualized-and-unified file system and the replication-destination virtualized-and-unified file system. It is also possible to adopt a method which does not provide consistency for each of the file objects in succession but maintains consistency between the files and directories as objects to be copied between the replication-source virtualized-and-unified file system and the replication-destination virtualized-and-unified file system by initially acquiring the list file of the files-and-directories tree in the replication-source virtualized-and-unified file system and that of the replication-destination virtualized-and-unified file system and comparing the acquired list files with each other. As a most typical method for acquiring the lists, the use of the ls command may be adopted.

Alternatively, it is also possible to adopt a method in which copy completion information indicative of whether or not files or directories have been copied in the replication destination is kept in the unified management directory 157 of the replication-source virtualized-and-unified file system 103, a copy of the directory tree is created first in the replication-destination virtualized-and-unified file system 104, and then the file is copied from the replication-source virtualized-and-unified file system to the replication-destination virtualized-and-unified file system.

A description will be given next to the flow of the entire replication process in the present embodiment. It is assumed that the administrator prepares the virtualized-and-unified file systems 103 and 104 and creates a partial copy of the virtualized-and-unified file system 103 in the virtualized-and-unified file system 104.

Figure 14:
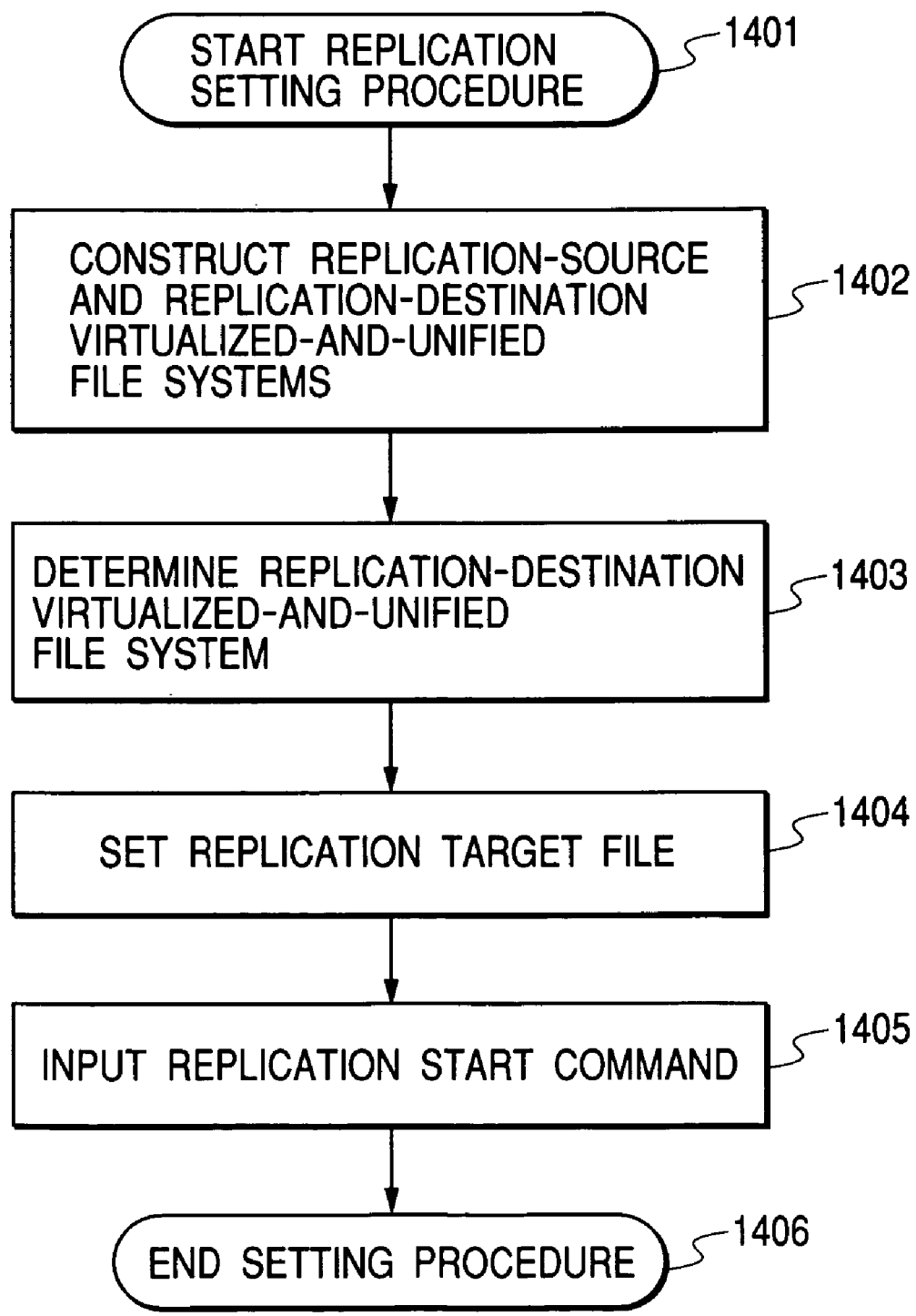
FIG. 14 is a flow chart illustrating a replication setting procedure in the foregoing embodiment.

FIG. 14 shows a procedure for setting replication between the plurality of virtualized-and-unified file systems, which is performed by the administrator. The replication setting procedure includes the setting of the virtualized-and-unified file systems (Step 1402), the setting of the replication-destination virtualized-and-unified file system (Step 1403), the setting of a replication target file (Step 1404), and the inputting of a replication start command (Step 1405), which are performed in this order.

In Step 1402, the administrator accesses the respective management units 150 and 160 of the replication-source virtualized-and-unified file system 103 and the replication-destination virtualized-and-unified file system 104 via a Web browser or by using a dedicated user interface program and performs the setting of the virtualized-and-unified file systems. Setup information includes the IP addresses of the virtualized-and-unified file systems, the name information thereof, the IP addresses of unification virtualizing system members, and the name information thereof. The management units 150 and 160 register the respective members of the individual virtualized-and-unified file systems in the host tables 155 and 165. In the host table 155, the network storages 120, 121, and 122 are registered and the identifiers PS1, PS2, and PS3 are set to the respective network storages 120, 121, and 122. In the host table 165 of the replication-destination virtualized-and-unified file system 104, network storages 123, 124, and 125 are registered and identifiers PS4, PS5, and PS6 are set to the respective network storages 123, 124, and 125. In the member registration process, the management units 150 and 160 copy the directories trees of the unified management directories 157 and 167 in the respective file systems of the individual network storages.

In Step 1403, the administrator accesses the management unit 150 of the replication-source virtualized-and-unified file system 103 via a Web browser or by using a dedicated user interface program and sets the replication-destination virtualized-and-unified file system 104. The management unit 150 registers the replication-destination virtualized-and-unified file system 104 in the replication host table 156 shown in FIG. 1. Specifically, VFS1 is set as an identifier for the replication-destination virtualized-and-unified file system 104. In addition, the management unit 150 of the replication-source virtualized-and-unified file system 103 sets the master flag 411 to "TRUE".

In Step 1404, the administrator accesses the replication-source virtualized-and-unified file system 103, in the same manner as in Step 1403, and sets files as objects to be copied. If the administrator designates only files belonging to a specified group as objects to be copied, a group identifier contained in a file identifier is returned to the management unit 150 via a Web browser. The management unit 150 holds the content of the setting in the rule table 412 shown in FIG. 4. For example, a group identifier="1" is held in the rule table 412 in the present embodiment.

In Step 1405, the administrator accesses the replication-source virtualized-and-unified file system 103, in the same manner as in Step 1404, and inputs the replication start command. After the inputting, the replication start command is written in the management unit 150 of the replication-source virtualized-and-unified file system 103. The writing can be accomplished by using a PUT command in accordance with the HTML protocol. The writing can also be accomplished with a well-known technology if a Web-compatible interface is used. Triggered by the writing by the administrator, the management unit 150 starts the replication process in the replication-source virtualized-and-unified file system 103. At this time, if the synchronization flag 410 is "FALSE", the consistency unit 403 is activated to perform the consistency processing, thereby maintaining the consistency of the file as an object to be copied between the virtualized-and-unified file system 103 and the virtualized-and-unified file system 104. After the consistency processing, the synchronization flag 410 is set to "TRUE". If the synchronization flag 410 is "TRUE", a file replication process can be started between the virtualized-and-unified file system 103 and the virtualized-and-unified file system 104.

An example of the file replication process will be shown next. The present embodiment assumes that the NFS protocol is used in a file access between the client and the replication-source virtualized-and-unified file system 103. In accordance with the NFS protocol, the client first issues a mount request to the replication-source virtualized-and-unified file system 103 and mounts the mount point of a shared file in a part of the file system at the client. The request reception unit 151 of the replication-source virtualized-and-unified file system 103 responds to the mount request from the client by using the well-known mountd. The mountd returns the file handle of the mount point in the replication-source virtualized-and-unified file system 103 to the client. From that time on, the client accesses the virtualized-and-unified file system 103 by using the file handle.

A consideration will be given to the case where, e.g., a client belonging to a group 1 creates a new file. If the client issues a new file create request (which is the CREATE request in accordance with the NFS protocol) to the replication-source virtualized-and-unified file system 103, the request reception unit 151 receives the request. The CREATE request contains the group identifier="1" and a user identifier="5" in the file identifier. The request reception unit 151 then calls the replication unit 152. The replication unit 152 starts the replication process shown in FIG. 5. In Process 510, the judgment processing is performed first. Since the CREATE request is an updating request, the result of the judgment processing 510 becomes "YES" in Process 602, as shown in FIG. 6. In Process 603, the master flag 411 of the replication-source virtualized-and-unified file system 103 is "TRUE" so that the result of the judgment becomes "YES". In Process 604, the synchronization flag 410 of the replication-source virtualized-and-unified file system 103 is "TRUE" so that the result of the judgment becomes "YES". Since the CREATE request is for a file in the subsequent Process 609, Process 610 is performed and it is judged whether or not the conditions in the rule table 412 shown in FIG. 4 are satisfied. As stated previously, the group identifier="1" has been held in the rule table 412. In the Process 610, a comparison is made between the group identifier in the CREATE request and the group identifier kept in the rule table 412. As a result of the comparison, the conditions are satisfied so that the result of the replication judgment in Process 606 becomes "YES", whereby the judgment processing 510 is ended.

Figure 5:
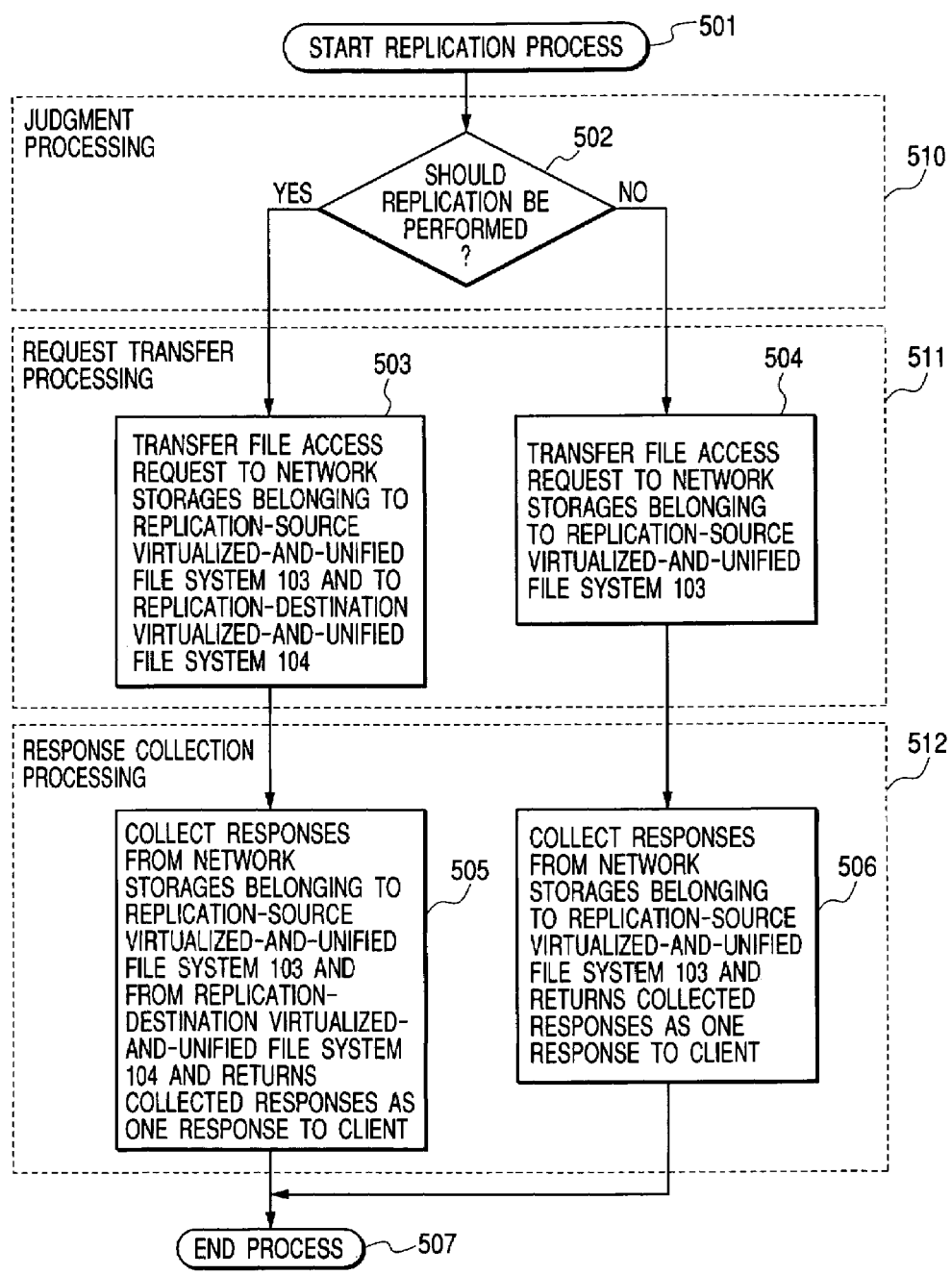
FIG. 5 is a flow chart illustrating a replication process in the foregoing embodiment.

Then, the request transfer processing 511 shown in FIG. 5 is performed. Since the result of the replication judgment is "YES", Process 503 is performed. Specifically, the CREATE procedure shown in FIG. 8 is performed in Process 503. In the CREATE procedure, a dummy file is created first in the replication-source virtualized-and-unified file system 157 in Process 802 and the i-node number of the file is acquired. In Process 803, the file-storing network storage PS is determined by using the host table 155 and the mapping unit 154. It is assumed herein that the file-storing network storage is PS1. Then, in Process 804, the identifier PS1 for the file-storing network storage is written in the dummy file F. Since the virtualized-and-unified file system 104 has been registered in the replication host table 156, the transfer of the CREATE request thereto is determined in Process 805. Process 806 issues the CREATE request to each of the file-storing network storage PS1 and the virtualized-and-unified file system VFS1.

In the CREATE procedure at the file-storing network storage PS1, a new file is created and a response is returned to the response collection unit 402 of the replication unit 152. At the same time, the CREATE request is also transferred to the virtualized-and-unified file system VFS1 and a response is transferred therefrom to the response collection unit 402 of the replication unit 152.

A description will be given to the processing of the CREATE request transferred from the replication-source virtualized-and-unified file system 103 to the replication-destination virtualized-and-unified file system 104 (VFS1). The request reception unit 161 of the replication-destination virtualized-and-unified file system 104 receives the CREATE request issued from the replication-source virtualized-and-unified file system 103. The request reception unit 161 invokes the replication unit 162. The replication unit 162 performs the judgment processing shown in FIG. 6 by using the judgment unit 163 and it is judged in Process 602 whether or not the file access request is an updating request. Since the CREATE request is an updating request, the result of the judgment becomes "YES". Then, in Process 603, it is examined whether or not the master flag is "TRUE". Since the virtualized-and-unified file system 104 is a replication destination, the master flag is "FALSE". Accordingly, the result of the judgment in Process 603 is "NO" and the result of the replication judgment in Process 607 is also "NO". Since the result of the replication judgment is "NO" in the request transfer processing 511 shown in FIG. 5, Process 504 is performed. In Process 504, the CREATE request is transferred to the file-storing network storage by using the host table 165. In Process 506, the response is returned to the response collection unit 402 of the replication unit 152 of the replication-source virtualized-and-unified file system 103.

The response collection unit 402 of the replication unit 152 of the virtualized-and-unified file system 103 collects respective responses from the virtualized-and-unified file system VFS1 and the file-storing network storage PS1 and returns the collected responses as one response to the client, whereby the replication process is ended.

In the case of performing replication in response to the CREATE request and the MKDIR request, the present embodiment uses the initial attributes (corresponding to the sattr in the NFS protocol) possessed as arguments by the CREATE request and the rule table 412 for the judgment of whether or not the files and directories are objects to be copied.

In the case of an updating file access request other than the CREATE request and the MKDIR request, whether or not replication should be performed is judged through a comparison between the attribute information of the directory in the unified management directory 157 and of the dummy file and the copying conditions in the rule table 412.

Variation 1 of Embodiment

In the typical embodiment described above, each of the dummy files holds the identifier for the network storage storing therein the file entity to associate the unified management directory 157 with each of the network storages keeping the file entities. In accordance with the management method, however, it is necessary to open the dummy file for each file access request and read the identifier for the network storage so that overhead for the opening of the dummy file is increased disadvantageously.

To eliminate the disadvantage, Variation 1 does not provide the dummy file disposed in the unified management directory 157 with the identifier for the network storage. Instead, Variation 1 divides the files into groups and determines identifiers for the network storages holding the files on a per file-group basis.

Figure 15:
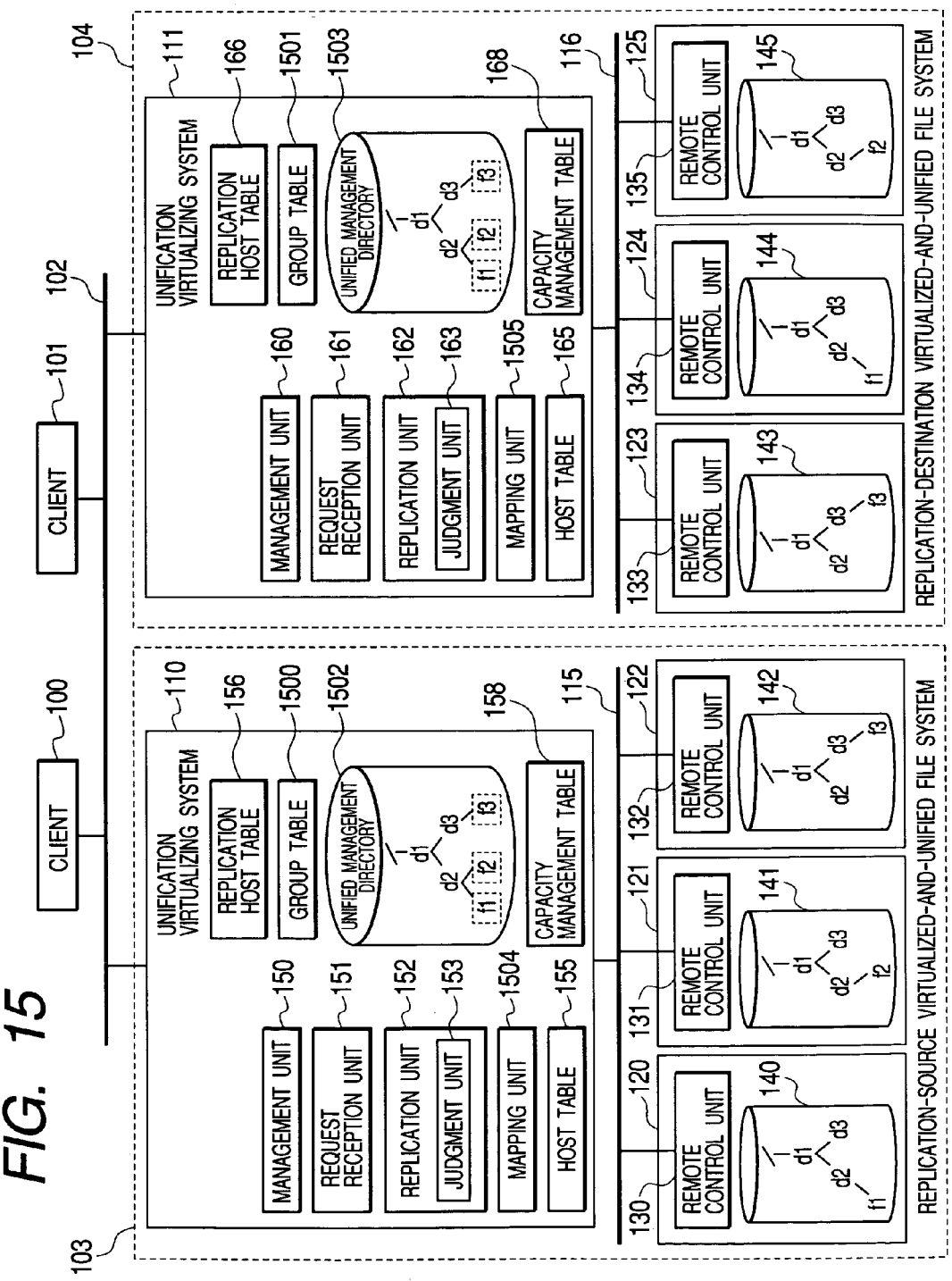
FIG. 15 is a block diagram showing an entire structure of a network storage system as Variation 1 of the embodiment.

FIG. 15 shows a structure of a network storage system in Variation 1. In Variation 1, the unification virtualizing systems 110 and 111 of the virtualized-and-unified file systems 103 and 104 have group tables 1500 and 1501. The structure of the dummy files in each of the unified management directories 1502 and 1503 and the processing by each of the mapping units 1504 and 1505 are different from those in the embodiment. Of the file access requests processed by the replication unit 152, the processing of the requests when the file entity kept in the network storage is accessed is different. Specifically, the process of determining the file-storing network storage in each of the CREATE procedure, the READ procedure, the WRITE procedure, the RENAME procedure, the REMOVE procedure, the SYMLINK procedure, and the LINK procedure is different. If the file object to be accessed is a file in the SETATTR request or the GETATTR request, the process of determining the file-storing network storage is different.

Figures 16, 17:
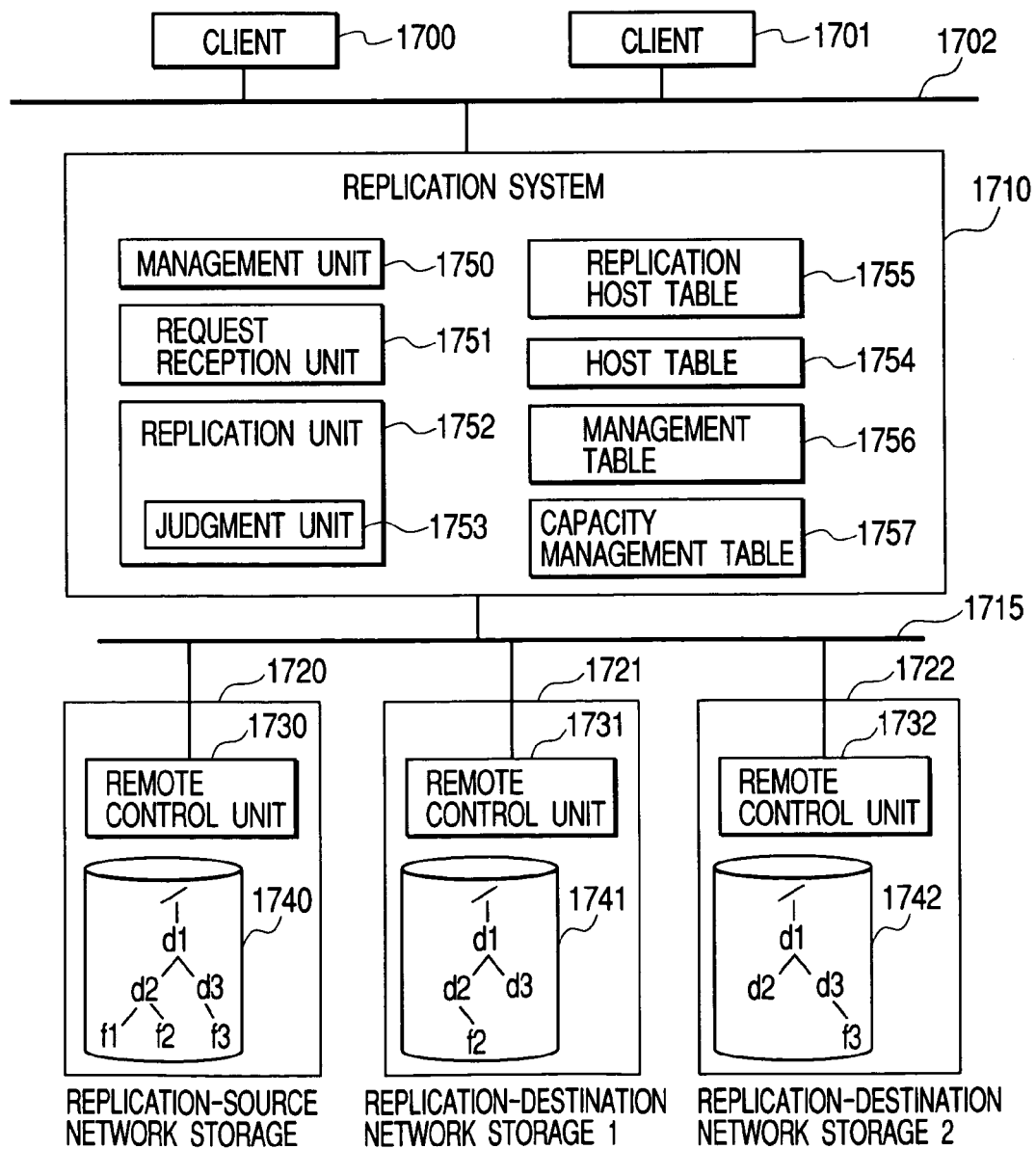
FIG. 16 is a view showing a structure of a group table 1500 of Variation 1 mentioned above.
FIG. 17 is a block diagram showing an entire structure of a network storage system as Variation 2 of the embodiment.

FIG. 16 shows a structure of the group table 1500. A group table 1601 has the same structure as a group table 1600. The group table 1600 provides a correspondence between a file and a file group to which the file belongs. Specifically, the group table 1600 provides the i-node number I as a file identifier and a file group identifier G identified with the i-node number I. The row 1601 shows the identification numbers 0 to 3 of four file groups. The row 1602 shows the identifiers PS for the network storages storing therein files belonging to the individual file groups in the row 1601. The files belonging to the file group 0 are stored in the network storage having an identifier PS1, while the files belonging to the file group 3 are stored in the network storage having an identifier PS2. To recognize which one of the network storage identifiers corresponds to which one of the network storages, the host table 155 may be referred to appropriately.

Although respective dummy files kept in distributed relation in the individual network storages are placed in the unified management directory 1502, identification information for the file-storing network storages is not held in the dummy files in Variation 1. The unified management directory 1503 also has the same structure as the unified management directory 1502.

The mapping unit 1504 provides a correspondence between a file and a file group to which the file belongs. Specifically, the correspondence is provided as a hash function using, as retrieval keys, the i-node numbers I which are the identifiers for the dummy files managed in the unified management directory 157 and using hash values as file group identifiers. In a hash function when files are divided into N file groups, e.g., a value obtained by applying a modulo function in which the number of file groups is N (a remainder of a division with a divisor N) to the i-node number I is used as a file group identifier G. If the number N of file groups is 4, the file group identifiers assume any of 0 to 3. The number N of file groups is invariable irrespective of the different structures of the network storage systems. The mapping unit 1505 has the same structure as the mapping unit 1504.

A description will be given next to the flow of the replication process in Variation 1 with reference to FIG. 15. When the client issues a file update request (WRITE request) to the replication-source virtualized-and-unified file system 103, the request reception unit 151 receives the request. Upon receipt of the request, the request reception unit 151 invokes the replication unit 152 and initializes the replication processing. In the replication processing, it is judged by using the judgment unit 153 whether or not replication should be performed.

If the result of the replication judgment is "YES", the request transfer processing is performed in the same manner as in the embodiment of the present invention. However, Variation 1 is different from the embodiment in that the file-storing network storage when an object to be accessed is a file is specified by using the unified management directory 1502 and the group table 1500.

In the case of, e.g., the WRITE request, the processing in Process 903 shown in FIG. 9 is different from that in the embodiment. First, the i-node number of the dummy file F to be accessed in response to the WRITE request is read and the file group is specified by using the mapping unit 1504. Then, the network storage PS is specified by referring to the group table 1500.

Variation 2 of Embodiment

In the typical embodiment described above, the replication method which creates in real time a partial copy of any of a plurality of virtualized-and-unified file systems therebetween has been described. Variation 2 of the embodiment is different from the embodiment in that a partial copy of a file system is created in real time not between a plurality of virtualized-and-unified file systems but between a plurality of network storages.

FIG. 17 shows an example of a structure of an entire network storage system in Variation 2 of the embodiment. The network storage system is constituted by: clients 1700 and 1701; a network 1702; a replication system 1710; an internal network 1715; and network storages 1720 to 1722.

Since the structure of the network storage system is the same as in the embodiment of the present invention except for that of the replication system 1710, the description thereof will be omitted. The network storages need not have equal capacities. It is sufficient for the replication-destination network storage to have a capacity for holding directories and files as objects to be copied. Although each of a replication source and a replication destination is the network storage in Variation 2, the replication destination may also be a virtualized-and-unified file system, while the replication source is the network storage.

The replication system 1710 is constituted by: a management unit 1750; a request reception unit 1751; a replication unit 1752; a judgment unit 1753; a host table 1754; a replication host table 1755; a management table 1756; and a capacity management table 1757. Variation 2 of the embodiment is characterized by the replication system 1710. Although the replication system 1710 does not have a remote control unit or a storage device in Variation 2, the replication system 1710 may also have a remote control unit or a storage device. The replication system 1710 may also include a plurality of replication systems.

Since the management unit 1750 and the request reception unit 1751 have the same structures and functions as the management unit 150 and the request reception unit 151 described in the embodiment of the present invention, the description thereof will be omitted. In Variation 2, the mapping unit 154 described in the embodiment of the present invention need not be provided.

The host table 1754 manages the IP address and name information of the replication-source network storage. The replication host table 1754 manages the replication-destination network storage. For example, the network storage 1720 is registered in the host table 1754 in Variation 2, while the network storages 1721 and 1722 are registered in the replication host table 1754.

The management table 1756 manages the files-and-directories structure of the file systems of the network storages registered in the host table 1754 and the attribute information thereof. As a management method, a file system may be used or a new table may also be provided, as described in the embodiment of the present invention.

The capacity management table 1757 manages the disk capacities of the network storages registered in the host table 1754 and in the replication host table 1755 and the amounts of disk use thereof. Of the disk capacities, a smallest capacity is managed as a disk capacity usable for replication, while a largest one of the amounts of disk use is managed as a disk capacity used for replication.

The replication unit 1752 has the same structure as the replication unit 152 shown in FIG. 1 and described in the embodiment of the present invention. However, the master flag 411 need not be provided in Variation 2 since it is possible to determine which one of the network storages holds the master files and directories if the content of registration in the host table 1754 is examined. In the case of a structure in which the replication system is contained in each of the network storages, however, the master flag 411 is set to "TRUE" in the replication system of the network storage as a copy source.

The judgment unit 1753 judges whether or not the replication process should be performed based on the type of the file access request, the synchronization flag 410, and whether or not conditions set to the rule table 412 are satisfied. In contrast to the embodiment of the present invention in which conditions are judged by also using the master flag 411, the master flag 411 is not used in Variation 2.

Variation 2 is the same as the typical embodiment described above in that the judgment unit 1753 is provided with the synchronization flag 410 and the rule table 412 and a judgment method using the synchronization flag and the rule table is implemented.

In the replication process according to Variation 2, the judgment processing is performed first by using the judgment unit 1753.

In the judgment processing, it is judged first whether or not the file access request is an updating request, judged next whether or not the synchronization flag is "TRUE", and then judged whether or not a target of the access request is an object to be copied in accordance with the rule table 412. If the result of each judgment is "YES", the result of the replication judgment becomes "YES".

If the result of the replication judgment is "YES", the file access request is transferred to the network storages registered in the host table 1754 and to the network storages registered in the replication host table 1755 in the request transfer processing. If the result of the replication judgment is "NO", the file access request is transferred only to the network storages registered in the host table 1754.

Variation 3 of Embodiment

In the typical embodiment described above, the replication method which creates in real time a partial copy of data held in the virtualized-and-unified file system has been described. In Variation 3, the client also creates, in a plurality of virtualized-and-unified file systems performing file replication therebetween, a copy of setup information set to the replication-source virtualized-and-unified file system via the management unit 150. The setup information of an object to be copied includes an account, security information, and time information. There are also cases where the setup information includes an IP address and name information. The setup information is packed in a specified file every time it is updated. The specified information is set as an object to be copied to the rule table 412 such that it is necessarily copied when the setting is changed. If trouble occurs in the replication-source virtualized-and-unified file system 103 and it cannot be used, the management unit 160 unpacks the specified file and resets the setup information in response to the setting of the replication-destination virtualized-and-unified file system 104 as a master by the administrator.

Although Variation 3 has described the method in which the setup information is copied as the specified file in the replication-destination virtualized-and-unified file system 104, there may also be adopted a method in which a client computer acquires a backup of the setup information. It is also possible for the client to explicitly input the setup information to each of the replication-source and replication-destination virtualized-and-unified file systems.

Variation 4 of Embodiment

In the typical embodiment described above, the replication method which creates in real time a partial copy of data held in the virtualized-and-unified file system obtained by virtualizing three network storages has been described. Even if only one network storage is provided, therefore, it is necessary to access the unified management directory 157, specify, from the dummy file, the identifier for the network storage holding the file entity, and access the network storage. In other words, a disk access to the unified management directory 157 and a disk access to the network storage constantly occur, though the network storage holding the file entity is determined uniquely. In Variation 4, the file entity is kept in the dummy file in the unified management directory 157 if the number of such network storages is one for a higher-speed file access and higher-speed file replication. In an access to the unified management directory 157, the request processing unit 401 of the replication unit 152 does not specify the network storage holding therein the file entity but writes data as the file entity.

Thus, in the distributed system composed of the plurality of network storages, the request reception unit solely receives the file access request from the client, judges whether or not replication should be performed by using the management table, and transfers only the file access request for the file as the object to be copied to each of the replication-source network storage and the replication-destination network storage, thereby enabling real-time creation of a partial copy of the file system in the replication-source network storage in another network storage. This enables efficient backing up of data held in the large-capacity network storage.

If the file access request is issued from the client in the virtualized-and-unified file system composed of the plurality of network storages and the unification virtualizing system, the unification virtualizing system receives the file access request, specifies the network storage in which the file to be accessed is present by using the unified management directory, judges whether or not the file to be accessed in response to the file access request is the object to be copied, and simultaneously transfers the file access request to the network storage to be accessed and to the unification virtualizing system in the replication-destination virtualized-and-unified file system only when the file access request is for the file as the object to be copied, thereby enabling real-time creation of a partial copy of the replication-source virtualized-and-unified file system in another virtualized-and-unified file system. This enables efficient backing up of data in the large-capacity virtualized-and-unified file system.

Since the unification virtualizing system composing the virtualized-and-unified file system as the target of replication further has the unit for maintaining consistency between the files and directories as objects to be copied and the copied files and directories in the replication-destination virtualized-and-unified file system, even when the occurrence of trouble impairs the consistency of the files and directories as the objects to be copied between the replication-source and replication-destination virtualized-and-unified file systems, consistency can easily be fixed after trouble recovering process. This achieves a reduction in administration cost required for the trouble recovery.

What is claimed is:

1. A file replication method for creating, in a distributed file system including a plurality of network storage apparatus and a replication system each connected to a network, the replication system having a management table for managing attribute information of all files and all directories in a first network storage apparatus as a replication source, a partial copy of data stored in the first network storage apparatus into a second network storage apparatus as a replication destination, said method comprising the steps of:

preliminarily recording replication information indicating whether or not each of the files and the directories stored in said first network storage apparatus is an object to be copied in said replication system;

preliminarily examining whether or not each of files and directories, that is indicated as an object to be copied, in said first network storage apparatus and each of copied files and directories maintain consistency, and setting a synchronization flag to each of files and directories which is proved to be consistent with a copy thereof;

receiving a file access request from a client;

judging that a replicating operation should be performed with execution of said file access request under conditions that said file access request is an updating file access request and that an access target of said file access request is a file or a directory which is indicated as an object to be copied and to which the synchronization flag is set;

simultaneously transferring, if a result of said judgment is such that the replicating operation should be performed, said updating file access request to said first network storage apparatus and to said second network storage apparatus;

collecting from said first network storage apparatus and from said second network storage apparatus responses to the updating file access request and making the collected responses into one response indicating that the updating file access request is done; and sending said one response to the client.

2. A replication system for performing file replication between a plurality of network storage apparatus connected to a network, said replication system comprising:

a management table for managing attribute information of all files and directories in a network storage apparatus as a replication source;

a unit for holding replication information indicative of whether or not replication should be performed;

a unit for preliminarily examining each of files and directories, that is indicated as an object to be copied, in said network storage apparatus and each of copied files and directories maintain consistency;

a unit for setting a synchronization flag to each of files and directories which is proved to be consistent with a copy thereof;

a request reception unit for receiving, a file access request from a client;

a judgment unit for judging that replication should be performed with execution of said file access request under conditions that said file access request is an updating file access request and that an access target of said file access request is a file or a directory which is indicated as an object to be copied and to which the synchronization flag is set;

a request processing unit for simultaneously transferring, in accordance with a result of the judgment, the updating file access request to the network storage apparatus as the replication source and to another network storage apparatus as a replication destination;

a collecting unit for collecting from said network storage apparatus and said another network storage apparatus responses to the updating file access request and making the collected responses into one response indicating that the updating file access request is done; and a response transmitting unit for sending said one response to the client.

3. The replication system according to claim 2, wherein said replication information is at least one rule indicating that a file having a specified user or group identifier, a file belonging to a specified directory, or a file having a specified file identifier as an object to be copied as preliminarily recorded.

4. A file replication method for creating, in an external network storage, a partial copy of data stored in a virtualized-and-unified file system including a plurality of network storages and a unification virtualizing system for managing, in a unified manner, a structure of files and directories present in distributed relation in the network storages and attribute information thereof and allowing a unified access to the network storages from an outside, said method comprising the steps of:

preliminarily recording, in said unification virtualizing system, replication information indicating each of the files and the directories stored in one of said network storages is an object to be copied;

preliminarily examining each of files and directories, that is indicated as an object to be copied, in said network storage and each of copied files and directories maintain consistency, and setting a synchronization flag to each of files and directories which is proved to be consistent with a copy thereof;

receiving, in a unified manner, a file access request from a client to said virtualized-and-unified file system;

specifying the network storage storing therein the file as a target of said file access request by using a mapping unit for determining and setting the network storage for each of the files;

judging, by using said replication information, that a replicating operation should be performed with execution of said file access request under conditions that said file access request is an updating file access request and that an access target of said file access request is a file or a directory which is indicated as an object to be copied and to which the synchronization flag is set;

transferring said file access request to the specified network storage and, if a result of said judgment is such that the replicating operation should be performed, transferring the updating file access request also to the external network storage as a replication destination, and thereby causing each of the network storage storing therein said target file and the external network storage as the replication destination to execute a file access requested by the file access request;

collecting from said specified network storage and said external storage responses to the updating file access request and making the collected responses into one response indicating that the updating file access request is done; and sending said one response to the client.

5. A unification virtualizing system for a plurality of network storages, said system virtually showing the plurality of network storages connected to a network as a single file system and comprising:

a unified management directory for managing a structure of all files and directories present in said virtualized-and-unified file system and attribute information thereof;

a unit for holding replication information indicating whether or not each of the files and the directories stored in one of said network storages is an object to be copied into an external file system;

a unit for preliminarily examining each of files and directories, that is indicated as an object to be copied, in said network storage and each of copied files and directories maintain consistency;

a unit for setting a synchronization flag each of files and directories which is proved to be consistent with a copy thereof;

a request reception unit for receiving a file access request from a client;

a mapping unit for determining the network storage of a file access target of said file access request;

a judgment unit for judging that the file access target of said file access request should be replicated in said external file system under conditions that said file access request is an updating file access request and that an access target of said file access request is a file or a directory which is indicated as an object to be copied and to which the synchronization flag is set;

a request transfer unit for simultaneously transferring, if the judgment unit judges that replication should be performed, said updating file access request to the external file system as the replication destination and to the network storage determined by the mapping unit;

a collecting unit for collecting from said external file system and said network storage responses to the updating file access request and making the collected responses into one response indicating that the updating file access request is done; and a response transmitting unit for sending said one response to the client.

6. The unification vitalizing system for a plurality of network storages according to claim 5, wherein said judgment unit judges that replication should not be performed if the file access request is a read request and the file access request is not transferred to the external file system as the replication destination.

7. The unification vitalizing system for a plurality of network storages according to claim 5, wherein said replication information is at least one rule indicating that a file having a specified user or group identifier, a file subordinate to a specified directory, or a file having a specified file identifier is an object to be copied.

8. The unification vitalizing system for a plurality of network storages according to claim 5, further comprising:

a unit for holding master information indicating that the files and directories managed by the unified management directory are masters, wherein said judgment unit judges replication should be performed in accordance also with the master information.

9. The unification vitalizing system for a plurality of network storages according to claim 7, wherein said replication information includes not only the rule but also information for identifying the virtualized-and-unified file system to which the rule is applied.

10. The unification vitalizing system for a plurality of network storages according to claim 5, further comprising:

a capacity management unit for periodically acquiring respective disk capacities and amounts of disk use of said virtualized-and-unified file system and said external file system as the replication destination and determining, from said disk capacities and amounts of disk use, a disk capacity and an amount of disk use which allow for replication.

11. The replication method according to claim 1, wherein said replication information, which indicates each of the files and the directories stored in said first network storage apparatus is an object to be copied, was preliminarily set by an administrator and then recorded in said replication system.

* * * * *

UNITED STATES PATENT AND TRADEMARK OFFICE
CERTIFICATE OF CORRECTION

PATENT NO. : 7,590,667 B2  Page 1 of 1
APPLICATION NO. : 10/767778
DATED : September 15, 2009
INVENTOR(S) : Yasuda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this

Twenty-first Day of September, 2010

David J. Kappos
*Director of the United States Patent and Trademark Office*